US012417675B2

(12) United States Patent
Kendall et al.

(10) Patent No.: US 12,417,675 B2
(45) Date of Patent: Sep. 16, 2025

(54) GAMING SYSTEM WITH FEATURE GAME HAVING COLLECTABLE COMPONENTS FOR PRIZES

(71) Applicant: Aristocrat Technologies Australia Pty Limited, North Ryde (AU)

(72) Inventors: Karen Kendall, Toongabbie (AU); James Loader, Springfield (AU); Lauren Paterson, Kellyville (AU); Antoon Visser, Coogee (AU)

(73) Assignee: Aristocrat Technologies Australia Pty Ltd., North Ryde (AU)

(*) Notice: Subject to any disclaimer, the term of this patent is extended or adjusted under 35 U.S.C. 154(b) by 0 days.

(21) Appl. No.: 18/196,320

(22) Filed: May 11, 2023

(65) Prior Publication Data

US 2023/0282070 A1 Sep. 7, 2023

Related U.S. Application Data

(63) Continuation of application No. 17/129,427, filed on Dec. 21, 2020, now Pat. No. 11,694,517, which is a (Continued)

(30) Foreign Application Priority Data

Mar. 26, 2019 (AU) ................................ 2019901012
Sep. 20, 2019 (AU) ................................ 2019232939

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3213; G07F 17/34; G07F 17/3267
See application file for complete search history.

(56) References Cited

U.S. PATENT DOCUMENTS 5,833,537 A * 11/1998 Barrie ................ G07F 17/3265 D21/370
5,947,820 A * 9/1999 Morro ................ G07F 17/3258 273/299

(Continued)

FOREIGN PATENT DOCUMENTS

| | | | |
|---|---|---|---|
| AU | 2008202678 | A1 | 2/2009 |
| AU | 2017279696 | A1 | 7/2018 |
| WO | 2017205905 | A1 | 12/2017 |

OTHER PUBLICATIONS

Notice of Allowance dated Sep. 11, 2023 for U.S. Appl. No. 29/881,793 (pp. 1-10).

(Continued)

*Primary Examiner* — Steve Rowland
(74) *Attorney, Agent, or Firm* — Weaver Austin Villeneuve & Sampson LLP

(57) ABSTRACT

An electronic gaming device comprising a display that displays a plurality of symbols in a plurality of symbol positions, a game controller that determines if the plurality of symbols include a trigger symbol, in response to determining that the plurality of symbols include the trigger symbol, controls the display to display the trigger symbol being transformed into a prize component symbol, incrementally animates a filling of a prize component of a first prize with the prize component symbol, and awards the first prize when a plurality of first prize components have been completely filled.

20 Claims, 34 Drawing Sheets

Related U.S. Application Data continuation of application No. 16/779,540, filed on Jan. 31, 2020, now Pat. No. 10,872,502.

(56) References Cited

U.S. PATENT DOCUMENTS

D428,399 S 7/2000 Kahn
6,097,390 A 8/2000 Marks
6,287,194 B1 9/2001 Okada
6,364,765 B1 * 4/2002 Walker ................ G07F 17/3234 463/19
6,428,412 B1 * 8/2002 Anderson ............... G07F 17/32 463/16
6,461,241 B1 10/2002 Webb
6,533,658 B1 3/2003 Walker
6,579,178 B1 6/2003 Walker
6,726,563 B1 * 4/2004 Baerlocher ......... G07F 17/3269 463/20
7,175,527 B2 2/2007 Bryant
D582,426 S 12/2008 Chen
7,601,059 B2 * 10/2009 Bozeman ................ G07F 17/32 273/272
7,722,456 B2 5/2010 Walker
D656,951 S 4/2012 Weir
D682,301 S 5/2013 Dijulio
D682,869 S 5/2013 Aroner
8,460,090 B1 6/2013 Gilliland
D696,265 S 12/2013 D'Amore
D696,677 S 12/2013 Corcoran
8,608,556 B2 * 12/2013 Olive ................. G07F 17/3267 463/16
D701,223 S 3/2014 Cho
D716,326 S 10/2014 Lee
8,957,897 B1 2/2015 Weichselbaum
D732,569 S 6/2015 Anzures
D747,349 S 1/2016 Park
D761,282 S 7/2016 Bain
D766,961 S 9/2016 Choi
D767,621 S 9/2016 Gagnier
D768,154 S 10/2016 Kim
D768,707 S 10/2016 Gagnier
D781,908 S 3/2017 Bhandari
D783,046 S 4/2017 Dzjind
D789,384 S 6/2017 Lin
9,711,006 B2 7/2017 Kendall
D798,895 S 10/2017 Kim
D802,011 S 11/2017 Friedman
D808,422 S 1/2018 Hoffman
D810,117 S 2/2018 Lin
D810,123 S 2/2018 McClellan
D816,698 S 5/2018 Oldenburger
D819,059 S 5/2018 O'Toole
D819,060 S 5/2018 Friedman
D824,933 S 8/2018 Harris
D830,406 S 10/2018 Baldi
D833,468 S 11/2018 Hsu
D841,047 S 2/2019 Papolu
10,242,534 B2 3/2019 Bryant
10,262,501 B2 4/2019 Satterlie
D849,036 S 5/2019 Fuller
D849,046 S 5/2019 Kuo
D850,464 S 6/2019 Satterlie
D855,064 S 7/2019 Lei
10,453,306 B2 10/2019 Crispino
D870,767 S 12/2019 Villafañe
D873,280 S 1/2020 Beesley
D873,852 S 1/2020 Pazmino
D873,855 S 1/2020 De Regt
10,535,229 B2 1/2020 Olive
D879,796 S 3/2020 Hung
D881,900 S 4/2020 Harmann
D882,625 S 4/2020 Dixit
D887,436 S 6/2020 Crandall
D888,089 S 6/2020 Chaudhri
D890,200 S 7/2020 Kokubo
D895,642 S 9/2020 Hoofnagle
D895,661 S 9/2020 Lei
10,789,812 B2 9/2020 Sanborn
D900,123 S 10/2020 Lopes
10,810,840 B2 10/2020 Casey
D903,691 S 12/2020 Olive
D907,652 S 1/2021 Momchilov
D908,134 S 1/2021 Liebowitz
D915,439 S 4/2021 Chapple
D916,817 S 4/2021 Cicchi
D916,922 S 4/2021 Ive
10,970,958 B2 4/2021 Hirai
D921,013 S 6/2021 Boese
D922,409 S 6/2021 Visser
D923,024 S 6/2021 Montoya
D923,047 S 6/2021 Montoya
D924,248 S 7/2021 Boese
D924,921 S 7/2021 Bowey
D925,575 S 7/2021 Harmann
D926,218 S 7/2021 Moreira
D926,778 S 8/2021 Lockley
D927,535 S 8/2021 Pazmino
D927,547 S 8/2021 Visser
D928,197 S 8/2021 Pazmino
D931,885 S 9/2021 Davies
D938,972 S 12/2021 Boese
D940,742 S 1/2022 Vickers
D942,466 S 2/2022 Degens
D943,609 S 2/2022 Li
11,263,871 B2 3/2022 Penacho
D949,166 S 4/2022 Marks
D949,167 S 4/2022 Marks
D951,272 S 5/2022 Olive
D952,646 S 5/2022 Ludwick
11,450,181 B2 9/2022 Uberuaga
D974,398 S 1/2023 Visser
D975,128 S 1/2023 Visser
11,676,444 B2 6/2023 Kendall
2002/0094856 A1 7/2002 Bennett
2002/0107072 A1 8/2002 Giobbi
2003/0064793 A1 * 4/2003 Baerlocher ............. G07F 17/32 463/20
2004/0038733 A1 2/2004 Walker
2004/0087368 A1 5/2004 Gauselmann
2004/0106448 A1 6/2004 Gauselmann
2004/0235552 A1 11/2004 Gauselmann
2004/0266520 A1 12/2004 Aida
2005/0043082 A1 * 2/2005 Peterson ................. G07F 17/32 463/20
2006/0003829 A1 1/2006 Thomas
2006/0046830 A1 * 3/2006 Webb .................. G07F 17/3213 463/20
2006/0148562 A1 7/2006 Walker
2007/0060254 A1 3/2007 Muir
2007/0077979 A1 * 4/2007 Cohn .................. G07F 17/3244 463/16
2007/0243923 A1 * 10/2007 Seelig ................. G07F 17/3267 463/16
2008/0113734 A1 5/2008 Watkins
2008/0207312 A1 8/2008 Seelig
2009/0069063 A1 3/2009 Thomas
2009/0093299 A1 4/2009 Acres
2009/0118000 A1 5/2009 Yoshizawa
2009/0197666 A1 8/2009 Visser
2009/0197668 A1 8/2009 Visser
2009/0264171 A1 10/2009 Acres
2009/0305770 A1 12/2009 Bennett
2010/0029381 A1 2/2010 Vancura
2010/0323780 A1 12/2010 Acres
2011/0105216 A1 5/2011 Cohen
2012/0046089 A1 2/2012 Kemper
2012/0122544 A1 * 5/2012 Roemer .................. G07F 17/34 463/20
2013/0065665 A1 * 3/2013 Watkins .................. G07F 17/32 463/20
2013/0065674 A1 * 3/2013 Luciano, Jr. ........ G07F 17/3244 463/25

(56) References Cited

U.S. PATENT DOCUMENTS

2013/0157741 A1* 6/2013 Pacey ................. G07F 17/3265
463/20
2013/0252704 A1* 9/2013 Gilbertson .......... G07F 17/3262
463/20
2013/0281181 A1 10/2013 Langille
2014/0018146 A1 1/2014 Zielinski
2014/0057699 A1 2/2014 Pade
2014/0080570 A1 3/2014 Watkins
2014/0080601 A1 3/2014 Knutsson
2014/0100022 A1* 4/2014 Lewis ................. G07F 17/3244
463/25
2014/0135096 A1 5/2014 Aida
2014/0171182 A1 6/2014 Versaci
2014/0179396 A1 6/2014 Aoki
2014/0248938 A1 9/2014 Tidke
2014/0274282 A1 9/2014 Mastropietro
2014/0274299 A1 9/2014 Kitamura
2014/0274308 A1* 9/2014 Guinn ................. G07F 17/3244
463/25
2014/0295942 A1 10/2014 Kendall
2014/0364193 A1* 12/2014 Williamson .......... G07F 17/326
463/21
2015/0087389 A1 3/2015 Ratner
2015/0094129 A1 4/2015 Acres
2015/0099569 A1 4/2015 Suda
2015/0141114 A1* 5/2015 Davis ...................... G07F 17/34
463/20
2015/0206397 A1 7/2015 Nelson
2015/0235511 A1* 8/2015 Zoble .................. G07F 17/3213
463/20
2015/0262450 A1* 9/2015 Elias ................... G07F 17/3244
463/25
2015/0287286 A1 10/2015 Beria
2016/0086442 A1 3/2016 Hilbert
2016/0104344 A1* 4/2016 Meyer ................. G07F 17/3258
463/20
2016/0133100 A1 5/2016 Pececnik
2016/0247361 A1* 8/2016 Meyer ................. G07F 17/3225
2016/0328926 A1 11/2016 Boese
2017/0024955 A1 1/2017 Pawloski
2017/0024957 A1 1/2017 Boese
2017/0076536 A1 3/2017 Shiraishi
2017/0092047 A1 3/2017 Hendricks
2017/0092070 A1 3/2017 Marston
2017/0169662 A1 6/2017 Froy
2017/0365127 A1* 12/2017 Zoble ...................... G07F 17/34
2018/0025585 A1 1/2018 Schmidt
2018/0075692 A1 3/2018 Hirai
2018/0082533 A1 3/2018 Hallerbach
2018/0089942 A1 3/2018 Filipour
2018/0130296 A1 5/2018 Berman
2018/0197379 A1 7/2018 Crispino
2018/0204632 A1 7/2018 Kang
2018/0225924 A1 8/2018 Cohen
2019/0043316 A1 2/2019 Selegue
2019/0051097 A1 2/2019 Marks
2019/0051099 A1 2/2019 Pawloski
2019/0130705 A1 5/2019 Nelson
2019/0304248 A1 10/2019 Bryant
2019/0355206 A1 11/2019 Kania
2020/0051374 A1 2/2020 Solaja
2020/0074784 A1 3/2020 Caputo
2020/0098221 A1 3/2020 Hendricks
2020/0160663 A1 5/2020 Berman
2020/0312086 A1 10/2020 Kendall
2020/0312087 A1 10/2020 Kendall
2020/0312095 A1 10/2020 Kendall
2020/0357240 A1 11/2020 Tam
2021/0065513 A1 3/2021 Ludwick
2021/0104127 A1 4/2021 Schaefer
2021/0110676 A1 4/2021 Davis
2021/0256811 A1 8/2021 Uberuaga
2022/0122010 A1 4/2022 Barcelos
2023/0015353 A1 1/2023 Uberuaga
2023/0033113 A1 2/2023 Penacho
2023/0169118 A1 6/2023 Aso
2024/0029517 A1 1/2024 Redick

OTHER PUBLICATIONS

Iv_design, "Different colorful empty bowl" Nov. 6, 2017 https://www.istockphoto.com/vector/ vector-illustration-set-of-food-icons-different-colourful-empty-bowls-for-breakfast-gm870471238.

Office Action (Non-Final Rejection) dated Dec. 14, 2023 for U.S. Appl. No. 18/141,836 (pp. 1-11).

Office Action (Notice of Allowance and Fees Due (PTOL-85)) dated Jan. 9, 2024 for U.S. Appl. No. 17/932,873 (pp. 1-8).

Office Action (Notice of Allowance and Fees Due (PTOL-85)) dated Feb. 26, 2024 for U.S. Appl. No. 18/141,836 (pp. 1-8).

Office Action dated Jan. 14, 2021 for U.S. Appl. No. 29/722,810 (pp. 1-7).

New Game Nice Profit Fu Dai Lian Lian Dragon Slot (Aristocrat), by Kuri Slot, dated Dec. 11, 2019, youtube.com [online]. Retrieved Jan. 11, 2021 from internet <URL:https://www.youtube.com/watch?v=5kX2ZXirx_O> (Year: 2019).

Fu Dai Lian Lian, dated to Oct. 25, 2020, aristocrat-us.com [online]. Retrieved from internet <URL:https://web.archive.org/web/20201125023325/https://www.aristocrat-us.com/fu-dai-lian-1ian> (Year: 2020).

Aristocrat Technologies Australia Pty Limited, "Fu Dai Lian Lian Panda," downloaded from https://www.aristocrat.com/apac/games/ba-bao-huang-long-emperor-2-2/, 4 pp. (downloaded on Feb. 13, 2020).

Vimeo, "Fu Dai Lian Lian," downloaded from https://vimeo.com/352401309, 10 pp. (downloaded on Feb. 13, 2020).

Youtube video, "Cash Fusion—Peacock Riches," MGS Summit Macau, downloaded from https://www.youtube.com/watch?v=6jaKVWJt56Q, 1 p. (Nov. 2017).

Office Action dated May 18, 2020 for U.S. Appl. No. 16/779,540 (pp. 1-12).

Notice of Allowance dated Aug. 27, 2020 for U.S. Appl. No. 16/779,540 (pp. 1-8).

Notice of Allowance dated Feb. 18, 2021 for U.S. Appl. No. 29/722,810 (pp. 1-8).

Notice of Allowance dated Jun. 16, 2021 for U.S. Appl. No. 29/722,813 (pp. 1-9).

Julia Lemba, "Moneybag Simple Cartoon" Mar. 14, 2019 https://www.istockphoto.com/vector/moneybag-simple-cartoon-infographics-isolated-on-blue-background-moneybag-simple-gm1135787086-302281081.

Office Action dated Jun. 18, 2021 for U.S. Appl. No. 16/790,548 (pp. 1-16).

Corrected Notice of Allowability dated Jul. 8, 2021 for U.S. Appl. No. 29/722,813 (pp. 1-2).

Office Action (Non-Final Rejection) dated Jan. 7, 2022 for U.S. Appl. No. 16/830,232 (pp. 1-13).

Office Action (Non-Final Rejection) dated Jan. 21, 2022 for U.S. Appl. No. 16/830,239 (pp. 1-19).

Office Action (Final Rejection) dated Jan. 20, 2022 for U.S. Appl. No. 16/790,548 (pp. 1-16).

Notice of Allowance dated Sep. 29, 2020 for US App. No. 16/659,177 (pp. 1-9).

Office Action (Non-Final Rejection) dated Jan. 10, 2022 for U.S. Appl. No. 17/150,839 (pp. 1-6).

Office Action (Non-Final Rejection) dated Feb. 22, 2022 for U.S. Appl. No. 17/129,427 (pp. 1-10).

Office Action (Non-Final Rejection) dated Mar. 29, 2022 for U.S. Appl. No. 17/388,894 (pp. 1-22).

Australian Examination Report for App No. AU2019222868, dated May 22, 2020, 4 pages.

Office Action dated Aug. 27, 2020 for U.S. Appl. No. 16/659,177 (pp. 1-6).

Notice of Allowance dated May 13, 2022 for U.S. Appl. No. 29/782,345 (pp. 1-11).

(56) References Cited

OTHER PUBLICATIONS

New Game Nice Profit, by Kuri Slot, dated Dec. 11, 2019, youtube.com [online]. Retrieved May 5, 2022 from internet <URL:https://www.youtube.com/watch?v=5kX2ZXirx_0> (Year:2019).
Office Action (Notice of Allowance and Fees Due (PTOL-85)) dated Apr. 27, 2022 for U.S. Appl. No. 17/150,839 (pp. 1-8).
Office Action (Notice of Allowance and Fees Due (PTOL-85)) dated May 17, 2022 for U.S. Appl. No. 16/790,548 (pp. 1-9).
Notice of Allowance dated May 16, 2022 for U.S. Appl. No. 29/809,073 (pp. 1-11).
Notice of Allowance dated Jun. 27, 2022 for U.S. Appl. No. 29/782,345 (pp. 1-8).
Notice of Allowance dated Jun. 20, 2022 for U.S. Appl. No. 29/795,991 (pp. 1-9).
Notice of Allowance dated Jun. 20, 2022 for U.S. Appl. No. 29/808,901 (pp. 1-9).
Notice of Allowance dated Jun. 27, 2022 for U.S. Appl. No. 29/809,073 (pp. 1-8).
Office Action (Notice of Allowance and Fees Due (PTOL-85)) dated Jul. 15, 2022 for U.S. Appl. No. 16/830,232 (pp. 1-9).
Office Action (Notice of Allowance and Fees Due (PTOL-85)) dated Jul. 25, 2022 for U.S. Appl. No. 17/129,427 (pp. 1-7).
Notice of Allowance dated Jul. 27, 2022 for U.S. Appl. No. 29/795,991 (pp. 1-4).
Notice of Allowance dated Aug. 19, 2022 for U.S. Appl. No. 29/795,991 (pp. 1-7).
Notice of Allowance dated Aug. 19, 2022 for U.S. Appl. No. 29/808,901 (pp. 1-7).
Office Action (Notice of Allowance and Fees Due (PTOL-85)) dated Sep. 1, 2022 for U.S. Appl. No. 16/830,239 (pp. 1-8).
Office Action (Notice of Allowance and Fees Due (PTOL-85)) dated Feb. 15, 2023 for U.S. Appl. No. 16/830,239 (pp. 1-5).
Office Action (Notice of Allowance and Fees Due (PTOL-85)) dated Oct. 19, 2022 for U.S. Appl. No. 16/830,232 (pp. 1-5).
Office Action (Notice of Allowance and Fees Due (PTOL-85)) dated Oct. 26, 2022 for U.S. Appl. No. 16/830,239 (pp. 1-5).
Office Action (Notice of Allowance and Fees Due (PTOL-85)) dated Oct. 21, 2022 for U.S. Appl. No. 17/129,427 (pages (1-7).
Office Action (Final Rejection) dated Nov. 21, 2022 for U.S. Appl. No. 17/388,894 (pp. 1-24).
Office Action (Notice of Allowance and Fees Due (PTOL-85)) dated Feb. 9, 2023 for U.S. Appl. No. 17/129,427 (pp. 1-7).
Office Action (Notice of Allowance and Fees Due (PTOL-85)) dated Jan. 31, 2023 for U.S. Appl. No. 16/830,232 (pp. 1-5).
Notice of Allowance dated May 1, 2023 for U.S. Appl. No. 29/809,716 (pp. 1-9).
Office Action (Non-Final Rejection) dated Jun. 23, 2023 for U.S. Appl. No. 17/932,873 (pp. 1-19).
Office Action (Notice of Allowance and Fees Due (PTOL-85)) dated Aug. 18, 2023 for U.S. Appl. No. 17/388,894 (pp. 1-9).
Office Action (Non-Final Rejection) dated Nov. 1, 2024 for U.S. Appl. No. 17/957,477 (pp. 1-10).
Office Action (Non-Final Rejection) dated Nov. 13, 2024 for U.S. Appl. No. 18/516,178 (pp. 1-11).
Office Action (Non-Final Rejection) dated Dec. 2, 2024 for U.S. Appl. No. 17/957,482 (pp. 1-15).
Australian Examination Report No. 1 issued in App. No. AU2019232939, dated Dec. 23, 2024, 7 pages.
Australian Examination Report No. 1 issued in App. No. AU2019232942 dated Feb. 13, 2025, 7 pages.

* cited by examiner

300

321 322 323 324 325

| | Reel strip position | Reel 1 | Reel 2 | Reel 3 | Reel 4 | Reel 5 |
|---|---|---|---|---|---|---|
| 301 | 1 | Scat 1 | 10 | Scat 3 | Q | Scat 1 |
| 302 | 2 | Wild | Q | K | A | 10 |
| 303 | 3 | J | K | 10 | 10 | A |
| 304 | 4 | Q | A | Q | Scat 2 | Scat 2 |
| 305 | 5 | 10 | Scat 2 | K | J | A |
| 306 | 6 | A | 9 | Scat 1 | Wild | Q |
| 307 | 7 | Scat 2 | Wild | J | 9 | K |
| 308 | 8 | A | Scat 3 | K | 13 | Scat 2 |
| 309 | 9 | Q | Q | 9 | A | 9 |
| 310 | 10 | K | 10 | Q | Q | Wild |
| 311 | 11 | J | A | 10 | J | 9 |
| 312 | 12 | 10 | Wild | Wild | K | Q |
| 313 | 13 | Scat 3 | K | A | Wild | 10 |
| 314 | 14 | Wild | J | A | Scat 3 | Wild |
| 315 | 15 | 9 | 10 | Wild | Scat 1 | A |

331 344 345

343 342 341

FIG. 3

FIG. 7
GRAND
$8,800.00
MINOR
$300.00
MAJOR
$750.0
MINI
$100.00
641
PROSPERITY
JACKPOT
LONGEVITY
752B
1912
GOOD LUCK!
88
752
752A

| Reel strip position | Reel 1 | Reel 2 | Reel 3 | Reel 4 | Reel 5 |
|---|---|---|---|---|---|
| 1 | Gold Scat | 10 | Gold Scat | Q | Gold Scat |
| 2 | Wild | Q | K | A | 10 |
| 3 | J | K | 10 | 10 | A |
| 4 | Q | A | Q | Gold Scat | Gold Scat |
| 5 | 10 | Gold Scat | K | J | A |
| 6 | A | 9 | Gold Scat | Wild | Q |
| 7 | Gold Scat | Wild | J | 9 | K |
| 8 | A | Gold Scat | K | 13 | Gold Scat |
| 9 | Q | Q | 9 | A | 9 |
| 10 | K | 10 | Q | Q | Wild |
| 11 | J | A | 10 | J | Wild |
| 12 | 10 | Wild | Wild | K | Wild |
| 13 | Gold Scat | K | A | Wild | Wild |
| 14 | Wild | J | A | Gold Scat | Wild |
| 15 | 9 | 10 | Wild | Gold Scat | Wild |

*FIG. 11*

FIG. 13
GRAND
$8,800.00
MAJOR
$750.05
MINOR
$300.00
MINI
$100.00
100 LINES
100 LINES
1912
88
1201A

FIG. 14
GRAND
$8,800.00
MAJOR
$750.05
MINOR
$300.00
MINI
$100.00
R
1201B
K
K
J
A
Q
K
R
M
A
A
Q
J
Q
J
100 LINES
100 LINES
1912
88
1201A
1202A

FIG. 16
931B
GRAND
$8,800.00
MAJOR
$750.05
MINOR
$300.00
MINI
$100.00
M
1202B
R
M
A
1912
88
1201A
1202A
1203A

FIG. 20
GRAND
$8,800.00
MAJOR
$750.05
MINOR
$300.00
MINI
$100.00
934D
MINI
BONUS
$100.00
WINNER!
1912
5951
88
2010

FIG. 21
931C
G R A N D
$8,800.00
M A J O R
M I N O R
$750.05
$300.00
M I N I
$100.00
932A
933A
934
100 LINES
100 LINES
Well done
1912
7078
88

2700

2721 2722 2723 2724 2725

| Reel strip position | Reel 1 | Reel 2 | Reel 3 | Reel 4 | Reel 5 |
|---|---|---|---|---|---|
| 1 | Scat 1 | 10 | Scat 3 | Q | Scat 1 |
| 2 | Wild | Q | K | A | 10 |
| 3 | J | K | 10 | 10 | A |
| 4 | Q | A | Q | Scat 2 | Scat 2 |
| 5 | 10 | Scat 2 | K | J | A |
| 6 | A | 9 | Scat 1 | Wild | Q |
| 7 | Scat 2 | Wild | J | 9 | K |
| 8 | A | Scat 3 | K | 13 | Scat 2 |
| 9 | Q | Q | 9 | A | 9 |
| 10 | K | 10 | Q | Q | Wild |
| 11 | J | A | 10 | J | Wild |
| 12 | 10 | Wild | Wild | K | Wild |
| 13 | Scat 3 | K | A | Wild | Wild |
| 14 | Wild | J | A | Scat 3 | Wild |
| 15 | 9 | 10 | Wild | Scat 1 | Wild |

2701 2702 2703 2704 2705 2706 2707 2708 2709 2710 2711 2712 2713 2714 2715

2743

2701

2741

2742

*FIG. 27*

FIG. 28
GRAND
$8,800.00
MINOR
$300.00
MAJOR
$750.05
MINI
$100.00
PROSPERITY
JACKPOT
LONGEVITY
PROSPERITY FEATURE
WON!
5 FREE GAMES
Grow reels and nudge wilds!
PRESS START FEATURE
1912
88
2805

FIG. 30
GRAND
$8,800.00
MINOR
$300.00
MAJOR
$750.05
MINI
$100.00
3141
3142
PROSPERITY
JACKPOT
TRIGGER COLLECTED
Well done
1912
88
3010

FIG. 32
GRAND
$8,800.00
MINOR
$300.00
MAJOR
$750.05
MINI
$100.00
TRIGGER COLLECTED
JACKPOT
TRIGGER COLLECTED
1912
280
88

GAMING SYSTEM WITH FEATURE GAME HAVING COLLECTABLE COMPONENTS FOR PRIZES

RELATED APPLICATIONS

The present application claims priority to U.S. patent application Ser. No. 17/129,427, filed Dec. 21, 2020, and entitled "Gaming System with Feature Game Having Collectable Components for Prizes," which claims priority to U.S. patent application Ser. No. 16/779,540, filed Jan. 31, 2020, issued on Dec. 22, 2020, as U.S. Pat. No. 10,872,502, and entitled "Gaming System with Feature Game Having Collectable Components for Prizes," which claims priority to Australian Patent Application No. 2019901012, filed Mar. 26, 2019, and also Australian Patent Application No. 2019232939, filed Sep. 20, 2019, which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Certain embodiments provide a gaming device, a method of operating a gaming device and a system where a composite feature game can be retriggered during a series of free games of a spinning reel game. If a feature is retriggered during the free games, the feature is collected. At the end of the free games, the processor examines the identity of the collected features. If two or more features are collected, the processor conducts a composite feature that has the characteristics of the individual feature games.

In an embodiment, a gaming device comprises a display, a processor, and a memory storing a) symbol data defining a plurality of reel strips, the reel strips comprising symbols including at least a first trigger symbol associated with a first feature game, a second trigger symbol associated with a second feature game and a plurality of non-trigger symbols, the symbols arranged on the reel strips so that one or both of the first and second trigger symbols can be selected at the same time, and (b) instructions. When the instructions are executed by the processor, they cause the processor to a) initiate a series of free games in response to the occurrence of a designated trigger condition. In each free game, the instructions cause the processor to (i) select symbols from the reel strips for display in a plurality of columns of symbol positions, wherein each column of symbol positions corresponds to a reel strip of the plurality of reel strips, (ii) display the selected symbols on the display in the plurality of columns of symbol positions, (iii) determine based at least in part on whether the selected symbols include one or both of the first and second trigger symbols, whether a trigger condition is met in respect of one or both of the first feature game and the second feature game, and (iii) upon a trigger condition being met in respect of one or both of the first and second trigger symbols, set the respective feature game as triggered. Upon both the first and second feature games being set as triggered at the conclusion of the free games, the instructions cause the processor to conduct a first composite feature game incorporating at least one characteristic of each of the first and second feature games.

Another embodiment, provides a method of operating a gaming device comprising a display and a memory storing symbol data defining a plurality of reel strips, the reel strips comprising symbols including at least a first trigger symbol associated with a first feature game, a second trigger symbol associated with a second feature game and a plurality of non-trigger symbols, the symbols arranged on the reel strips so that one or both of the first and second trigger symbols can be selected at the same time. The method comprises initiating a series of free games in response to the occurrence of a designated trigger condition. In each free game, the method comprises (i) selecting symbols from the reel strips for display in a plurality of columns of symbol positions, wherein each column of symbol positions corresponds to a reel strip of the plurality of reel strips, (ii) displaying the selected symbols on the display in the plurality of columns of symbol positions, (iii) determining based at least in part on whether the selected symbols include one or both of the first and second trigger symbols, whether a trigger condition is met in respect of one or both of the first feature game and the second feature game, and (iii) upon a trigger condition being met in respect of one or both of the first and second trigger symbols, setting the respective feature game as triggered. Upon both the first and second feature games being set as triggered at the conclusion of the free games, the method comprises conducting a first composite feature game incorporating at least one characteristic of each of the first and second feature games.

Another embodiment provides a system comprising one or more processors, and at least one memory storing (a) symbol data defining a plurality of reel strips, the reel strips comprising symbols including at least a first trigger symbol associated with a first feature game, a second trigger symbol associated with a second feature game and a plurality of non-trigger symbols, the symbols arranged on the reel strips so that one or both of the first and second trigger symbols can be selected at the same time, and (b) instructions. When the instructions are executed by the one or more processors, they cause the one or more processors to a) initiate a series of free games in response to the occurrence of a designated trigger condition. In each free game, the instructions cause the one or more processors to (i) select symbols from the reel strips for display in a plurality of columns of symbol positions, wherein each column of symbol positions corresponds to a reel strip of the plurality of reel strips, (ii) display the selected symbols on a display in the plurality of columns of symbol positions, (iii) determine based at least in part on whether the selected symbols include one or both of the first and second trigger symbols, whether a trigger condition is met in respect of one or both of the first feature game and the second feature game, and (iii) upon a trigger condition being met in respect of one or both of the first and second trigger symbols, set the respective feature game as triggered. Upon both the first and second feature games being set as triggered at the conclusion of the free games, the instructions cause the one or more processors to conduct a first composite feature game incorporating at least one characteristic of each of the first and second feature games.

BRIEF DESCRIPTION OF THE DRAWINGS

FIG. 3 illustrates an example reel strip layout.

FIG. 11 illustrates another example reel strip layout.

FIG. 27 illustrates another example reel strip layout.

DETAILED DESCRIPTION

Figure 1:
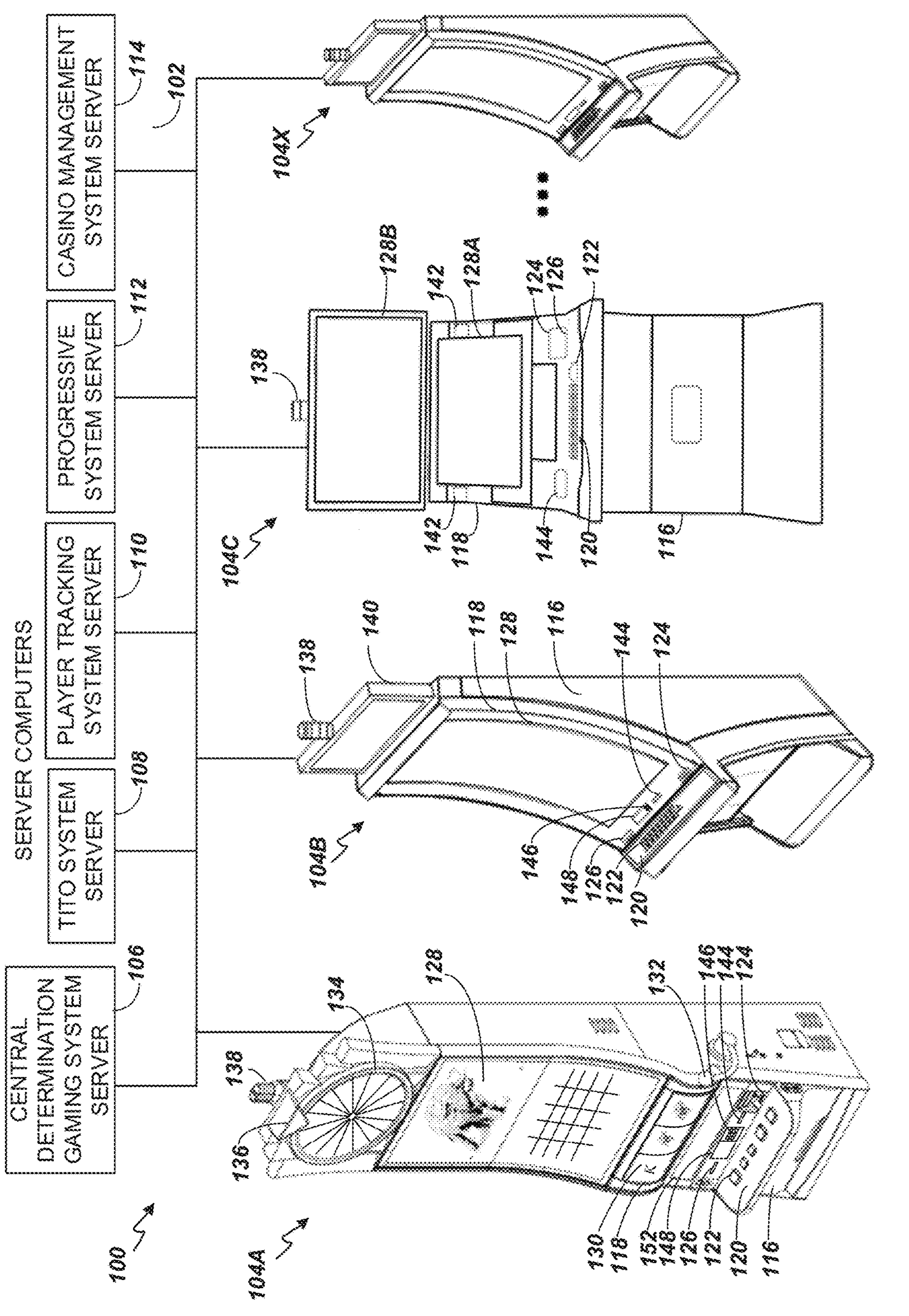
FIG. 1 is an exemplary diagram showing several EGMs networked with various gaming related servers.

Embodiments of the present disclosure represent a technical improvement in the art of electronic gaming machines, systems, and operating for such electronic gaming machines or systems. For example, at least some embodiments of the present disclosure provide additional functionality in an electronic gaming machine by employing a display that provides a visual transformation of game characteristics. In such embodiments, a plurality of symbols are randomly selected for animated display at a plurality of symbol positions during a series of free games. When the plurality of symbols selected include one or both of a first trigger symbol and a second trigger symbol, the gaming machine randomly collects a respective trigger based on the one or both of the first trigger symbol and the second trigger symbol. When both of the first trigger symbol and the second trigger symbol have been collected, the gaming machine conducts a composite game incorporating one characteristic of the first feature game and one characteristic of the second feature game.

Embodiments of the present disclosure represent another technical improvement in the art of electronic gaming machines, systems, and operating for such electronic gaming machines or systems. For example, at least some embodiments of the present disclosure provide additional functionality in an electronic gaming machine by employing a display that provides a visual transformation of game characteristics. In such embodiments, a plurality of symbols are randomly selected for animated display at a plurality of symbol positions. When the plurality of symbols selected include a first trigger symbol, the gaming machine randomly transforms the first trigger symbol into a prize component symbol. The gaming machine animates a filling of one of a plurality of prize components of a prize. When the plurality of prize components of the prize is complete, the gaming machine presents the prize.

Embodiments of the present disclosure represent another technical improvement in the art of electronic gaming machines, systems, and operating for such electronic gaming machines or systems. For example, at least some embodiments of the present disclosure provide additional functionality in an electronic gaming machine by employing a display that provides a visual transformation of game characteristics. In such embodiments, a plurality of symbols are randomly selected for animated display at a plurality of symbol positions. When the plurality of symbols selected include a first trigger symbol but not a second trigger symbol, the gaming machine randomly determines whether to conduct a first feature game based on one or more of a plurality of random numbers. When the plurality of symbols selected include the first trigger symbol and a second trigger symbol, the gaming machine randomly determines whether to conduct a third feature game selected among the first feature game, a second feature game, and a composite game incorporating at least one characteristic of each of the first feature game and the second feature game.

Further, the visual modification of game characteristics also provides an improved game machine display such that the player may only need to focus on symbols being displayed, visually collected, and visually moved to one or more prizes, without being overly burdened by complicated calculations. Further, embodiments of the present disclosure also provide multiple visual symbol collections to illustrate certain game characteristic combinations that are not conventional, as those that utilize memory to store symbol data for multiple symbol sets, such that one or more of these multiple sets are used to configure composite game characteristics to be selected. Thus, embodiments of the present disclosure are not merely new game rules or simply new display patterns, but provide technologic improvements to game display in the art of electronic gaming machines and software for such electronic gaming machines. Moreover, the above example is not intended to be limiting, but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a standalone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main cabinet 116 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a “ticket-in” reader that allows the player to use a casino issued credit ticket to load credits onto the gaming device 104A (e.g., in a cashless ticket (“TITO”) system). In such cashless embodiments, the gaming device 104A may also include a “ticket-out” printer 126 for outputting a credit ticket when a “cash out” button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player’s smartphone, a keypad 146, and/or an illuminated display 148 for reading, receiving, entering, and/or displaying player tracking information is provided in gaming device 104A (e.g., an EGM). In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a backlit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
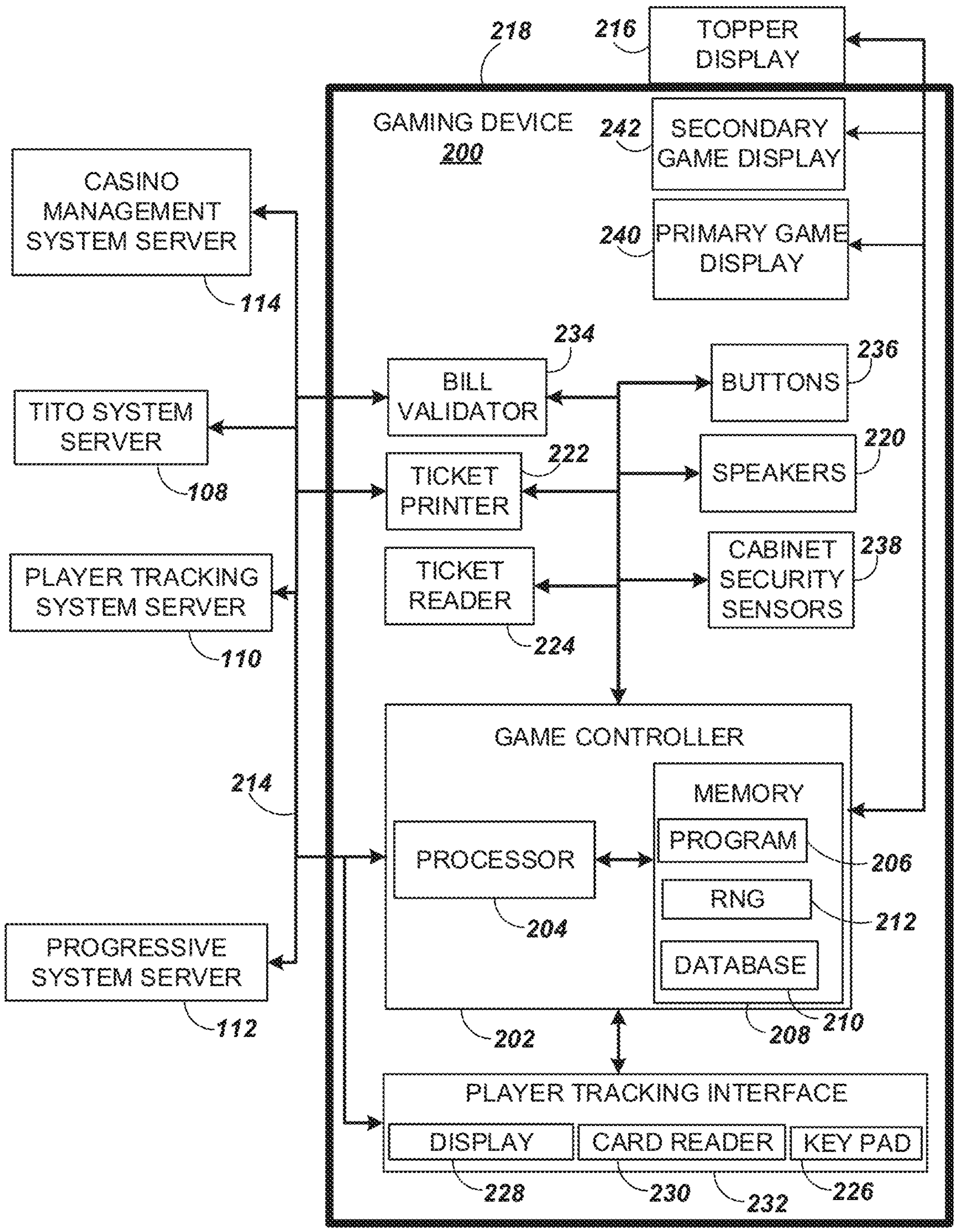
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the RNG 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints barcoded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

One regulatory requirement for games running on gaming device 200 generally involves complying with a certain level of randomness (e.g., that outcomes will be statistically independent, uniformly distributed over their range, unpredictable and pass statistical tests such as chi-square test, equi-distribution test, gap test, runs test, serial correlation test, etc.). Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG 212 can be integrated into the game controller 202 or processor 204. The RNG operations are often specialized and non-generic in order to comply with regulatory and gaming requirements. For example, in a reel game, program 206 can initiate multiple RNG calls to RNG 212 to generate RNG outcomes, where each RNG call and RNG outcome corresponds to an outcome for a reel. (Gaming regulations may require that each reel outcome be independent of each other reel outcome, such that no reel outcome depends on any other reel outcome.) In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%).

A game can use one or more weighted tables as part of a technical solution that satisfies regulatory requirements for randomness and RTP. In particular, a weighted table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a weighted table can involve engineering decisions with respect to how RNG outcomes are mapped to game outcomes for a given game feature, while still satisfying regulatory requirements for RTP. Configuring a weighted table can also involve engineering decisions about whether different game features are combined in a given entry of the weighted table or split between different entries (for the respective game features), while still satisfying regulatory requirements for RTP and allowing for varying levels of game volatility.

To meet a designated RTP, a game developer can utilize one or more weighted tables (e.g., weighted tables) to translate the RNG outcome to a symbol element, stop position on a reel strip layout, and/or randomly chosen aspect of a game feature. As an example, the weighted tables can regulate a prize payout amount for each RNG outcome and how often the gaming device 200 pays out the prize payout amounts. The gaming device 200 could utilize one weighted table to map the RNG outcome to a game outcome displayed to a player and a second weighted table as a pay table for determining the prize payout amount for each game outcome. The mapping between the RNG outcome to the game outcome controls the frequency in hitting certain prize payout amounts.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

FIG. 3 illustrates an example of a set 300 of five reel strips 321, 322, 323, 324, 325. In the example, each reel strip has fifteen reel strip positions 301-315. Each reel strip position of each reel has a symbol. For example, a "WILD" symbol 331 occupies the sixth reel strip position 306 of the fourth reel 324. The reel strips 321-325 are configured so that more than one trigger symbol can be selected at once. In this example, the reel strips include three different trigger symbols ("SCAT 1", "SCAT 2", and "SCAT 3"). The trigger symbols are located across the reel strips such that they can be selected concurrently, in particular by being selected from different reels. One possible selectable combination of all three trigger symbols is the selection of SCAT 3 symbol 343 from first reel 321, SCAT 1 symbol 344 from third reel 323, and SCAT 2 symbol from fifth reel 325. ("SCAT" is an abbreviation for "scatter" and is indicative of the fact that it doesn't matter at which symbol positions the "SCAT" symbols are selected.)

Other reels strips to those illustrated in FIG. 3 can be used, for example, reel strips where two or more WILD symbols are placed at consecutive reel strip positions of a reel strip. In other examples, the reel strips could have between 30 and 100 reel strip positions. The actual length of the reel strips depends on factors such as the number of WILD symbols (in general, the more WILDs there are, the longer the reel strip needs to be to maintain the target RTP), the number of trigger symbols on each reel, and volatility (in general, the higher the prize value is, the longer the reel strip needs to be to lower the hit rate to maintain the target RTP).

Figure 4:
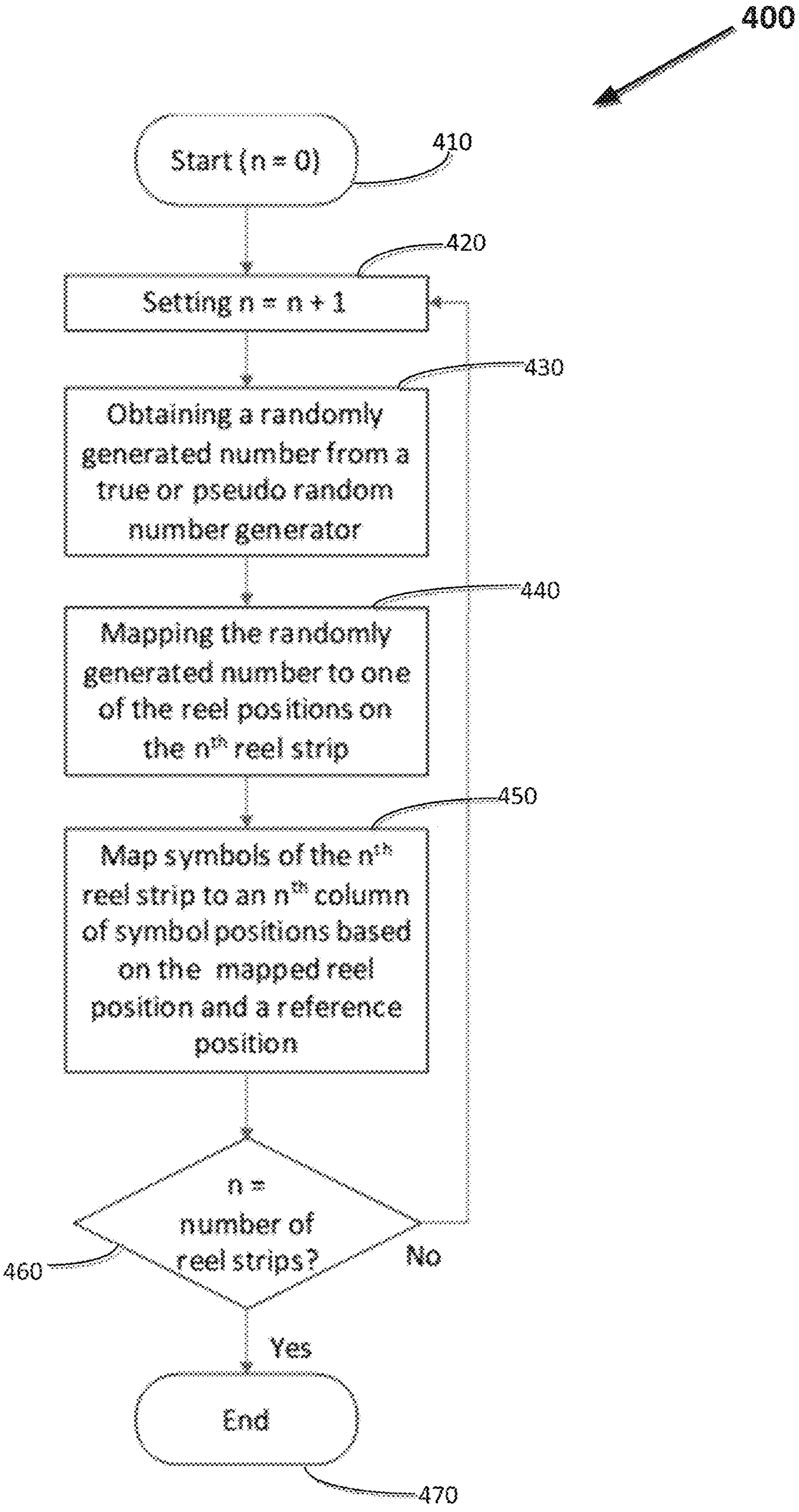
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator, such as RNG 212. At step 440 the processor maps the generated number to one of the reel positions of the nth reel strip. In the first iteration, this is the first reel strip. To map the generated number to one of the reel strip positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel strip position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. That is, in effect, selecting one reel strip position selects a portion of the reel strip having three reel strip positions for display. Referring to the example reel strips of FIG. 3, if the value returned by the RNG 212 is mapped to reel position 313, then for the first reel strip 321, "SCAT 3" symbol 343 is mapped to a bottom symbol position, "10" symbol 342 is mapped to a middle symbol position, and "J" symbol is mapped to a top symbol position. It will be appreciated that the same technique can be used to select a different number of symbols from each reel strip by using a different number of neighboring reel strip positions.

At step 460, the processor 204 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, at step 525, the processor 204 controls display 240 to display the selected symbols at the symbol positions.

Figure 5:
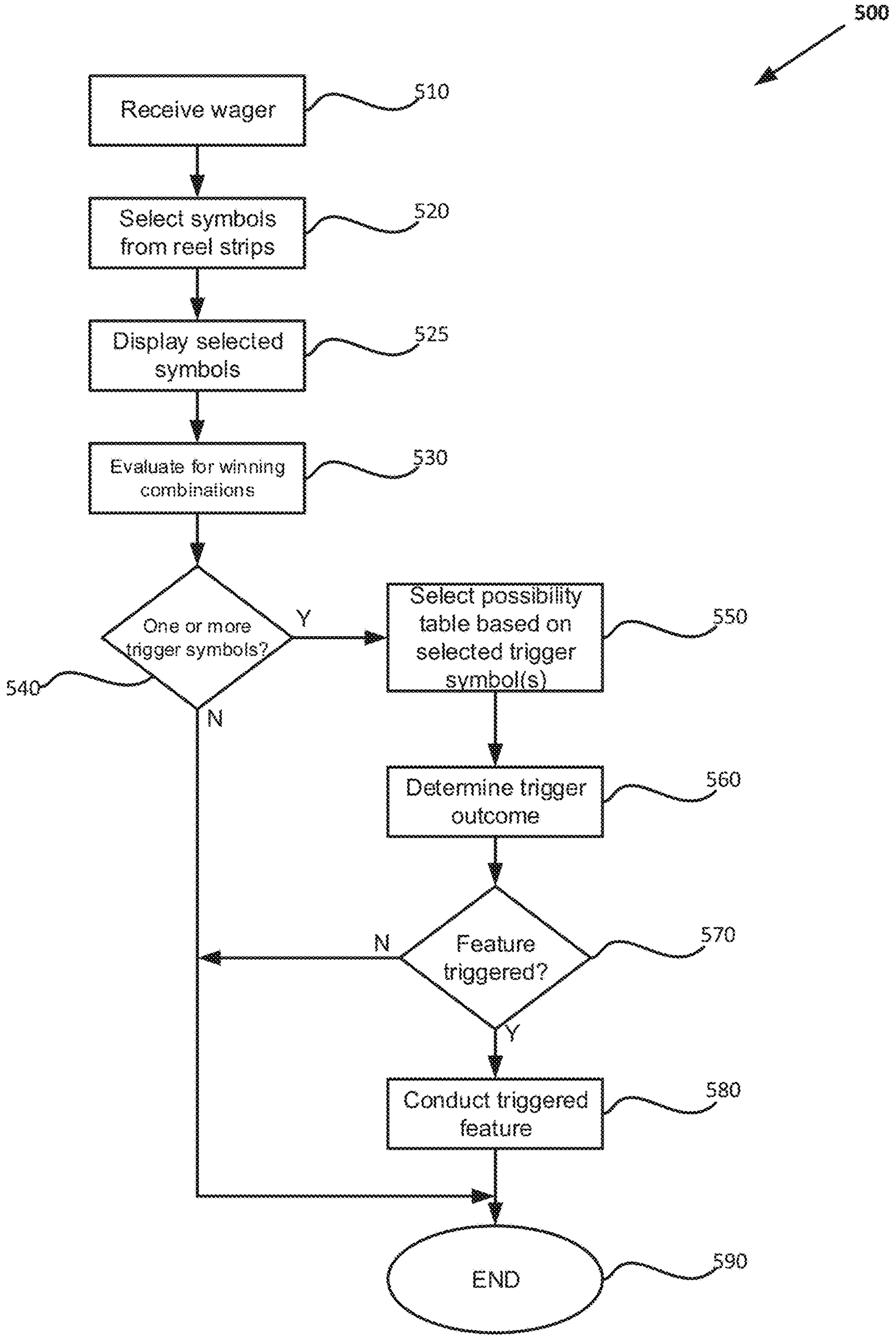
FIG. 5 is a flow chart of an embodiment.

FIG. 5 is a flow chart of a method 500 of operating a gaming device 200 of an embodiment. At step 510, the gaming device 200 receives the player's wager which is input as described above. In this example, the number of pay lines are fixed and the only option available to a player is to select a different bet amount (in effect a bet multiplier). At step 520, the processor 204 selects symbols for display on display 240 from reel strips stored in the memory 208.

At step 530, the processor 204 evaluates the selected symbols for winning combinations based on a pay table stored in memory 208. In an example, the processor 204 checks each pay line activated by the player's wager to determine whether it has a winning combination of symbols (e.g. three, four or five of a symbol included in the pay table). In an example, the processor 204 evaluates each pay line from left to right—i.e. the winning combination must start in the left most column. WILD symbols substitute for all other symbols in this evaluation. The processor 204 makes an award for each winning combination based on any selected bet multiplier by adding an award to a win meter stored in memory 208. In an example, there are 50 pay lines and each wager involves activating all pay lines—i.e. the number of pay lines are fixed.

As described above, the reel strips comprise three trigger symbols (SCAT 1, SCAT 2 and SCAT 3). In an embodiment, the selection of a respective symbol results in a chance of triggering an associated free-game feature game (Ft 1, Ft 2, Ft 3). Where more than one trigger symbol is selected, in addition to there being a chance of triggering the respective feature game, there is a chance of triggering features that combine game play characteristics of the individual feature games which are combined to form composite features (Ft 1+2, Ft 1+3, Ft 2+3, Ft 1+2+3). Whether a single feature or composite feature is triggered depends on a weight table. An example of a weight table is set out in Table 1 below:

TABLE 1

| | Ft1 | Ft2 | Ft3 | Ft (1 + 2) | Ft (1 + 3) | Ft (2 + 3) | Ft (1 + 2 + 3) | None | (sum) |
|---|---|---|---|---|---|---|---|---|---|
| Scat 1 | 0.5 | 0 | 0 | 0 | 0 | 0 | 0 | 0.5 | 1 |
| Scat 2 | 0 | 0.5 | 0 | 0 | 0 | 0 | 0 | 0.5 | 1 |
| Scat 3 | 0 | 0 | 0.5 | 0 | 0 | 0 | 0 | 0.5 | 1 |
| Scat 1&2 | 0.2 | 0.2 | 0 | 0.1 | 0 | 0 | 0 | 0.5 | 1 |
| Scat 1&3 | 0.2 | 0 | 0.2 | 0 | 0.1 | 0 | 0 | 0.5 | 1 |
| Scat 2&3 | 0 | 0.2 | 0.2 | 0 | 0 | 0.1 | 0 | 0.5 | 1 |
| Scat 1to3 | 0.1 | 0.1 | 0.1 | 0.08 | 0.04 | 0.04 | 0.04 | 0.5 | 1 |

In order to implement this functionality, at step 540, the processor 204 determines whether the selected symbols include one or more trigger symbols. In this respect, it will be appreciated step 540 can be initiated before or after the symbols are displayed. The processor 204 also determines the identity of each trigger symbol and uses the identity of the trigger symbol(s) to select a set of one or more trigger probabilities from the table at step 550. In this respect, referring to Table 1, in an example, where only a SCAT 1 is selected, processor 204 determines that a trigger probability of 0.5 applies to triggering the first feature game (Ft1), and hence there is a probability of 0.5 that no feature will trigger. In another example, where SCAT 1, SCAT 2, and SCAT 3 are selected, a trigger probability of 0.1 applies to triggering a first feature game, a trigger probability of 0.1 applies to triggering a second feature game, a trigger probability of 0.1 applies to triggering a third feature game, a trigger probability of 0.08 applies to a first composite feature game having characteristics of the first and second feature games, a trigger probability of 0.04 applies to a second composite feature game having characteristics of the first and third feature games, a trigger probability of 0.04 applies to a third composite feature game having characteristics of the second and third feature games, and a trigger probability of 0.04 applies to a fourth composite feature game having characteristics of the first, second and third feature games.

Based on the assigned trigger probability or probabilities, the processor 204 assigns ranges of values returnable by RNG 212 to the respective feature games. The processor 204, then at step 560, determines a trigger outcome based on the trigger probability or probabilities by obtaining a value from RNG 212 and comparing the returned value to the assigned ranges. If the returned value corresponds to one of the assigned ranges, the trigger outcome is that the processor 204 awards the relevant feature game at step 570, and after controlling the display 240 to indicate that feature game is awarded conducts 580 the relevant feature game as will be described in further detail below. In the example, of Table 1, a possible trigger outcome for all combinations of trigger symbols is that no feature game is triggered.

It will be appreciated that in another example, the weight table may associate ranges of values returnable from the RNG 212 with specific outcomes rather than specifying probabilities.

Table 1 is only one example where N=3 is the number of trigger symbols and there are up to $2^N-1=7$ triggerable features plus a probability of triggering no feature. In an alternative example, a feature game may trigger each time a trigger symbol lands, such that the processor 204, effectively only determines a trigger outcome that defines which of the $2^N-1=7$ triggerable features will trigger, not whether a feature will trigger.

In another example, where N=2 there may only be two trigger symbols and up to $2^N-1=3$ triggerable features, with or without a probability of triggering no feature. In another example, r there may be more than three trigger symbols. In an example, not all possible combinations of trigger symbols are mapped to a feature game. For example, where N=4, in one example, there are feature games associated with each individual trigger symbol and each combination of two trigger symbols but not with combinations of three or more trigger symbols.

An example set of feature games and how their characteristics are combined to form composite features is set out below.

Feature 1 (Reel Growth and Nudge WILDs—the "Prosperity Feature")

In this example, Feature 1 is triggerable based on an assigned trigger probability when SCAT 1 is a selected trigger symbol. When Feature 1 is triggered, 5 free games are awarded. During Feature 1 the array of symbol positions "grows" so that there are 6 symbol positions in each column. In each of the free games, 100 pay lines are played—i.e. will be evaluated by processor 204. As described below, at least during the free games, the reel strips that are employed include stacks of at least 6 WILD symbols. If a WILD appears in any position on reels 2, 3, 4, and/or 5 (that is in the relevant column of symbol position), the relevant reel(s) is nudged (moved to a new position) so that all symbols on that reel become WILD symbols. A nudge animation is played. The symbols are evaluated by the processor 204 after the reels have been nudged. As explained further below, a further feature game may be triggered during Feature 1.

Feature 2 (Additional Games and Multipliers—the "Longevity Feature")

Feature 2 is triggerable based on an assigned trigger probability when SCAT 2 is a selected trigger symbol. When Feature 2 is triggered, 5 free games are awarded. During Feature 2, every SCAT 2 symbol that is selected awards 1 free game, 2 free games, or a bonus credit prize. These selections are made by the processor 204 from a weight table in memory 208 without replacement such that, for example, once all possible instances of awarding 2 free games have occurred (assuming this happens first), any future occurrences of a SCAT 2 symbol, will either result in the award of 1 free game or a bonus credit prize. A multiplier is applied to all line wins during Feature 2. In an example, the value of the multiplier is 3. This multiplier is displayed in the top right corner of the main screen. As explained further below, a further feature game may be triggered during Feature 2.

Feature 3 (the "Jackpot Feature")

Feature 3 is triggerable based on an assigned trigger probability when SCAT 3 is a selected trigger symbol. When Feature 3 is triggered, 10 free games are awarded. SCAT 1, SCAT 2, and SCAT 3 symbols are replaced on the reel strips by "GOLD SCAT" symbols in this feature. A "GOLD SCAT" symbol is a "configurable symbol" that is determined dynamically by selecting from a number of possible "configuring symbols"—i.e. a set of symbols that can take the place of a "GOLD SCAT" symbol or be displayed at the reel strip position on the reel strip where the GOLD SCAT symbol is placed.

Each GOLD SCAT appearing when configured with a configuring symbol reveals either a credit prize or a letter which is a component of at least one prize. In an example, the letters "M", "I", "N", "A", "J", "O", "R", "G", "N", and "D" correspond to components of the "GRAND", "MAJOR", "MINOR", and "MINI" prizes. In one example, shown in some of the figures described below, there are separate symbols for each of the prizes. In the illustrated example, different colors are used for each prize—e.g. there are three different colored "M" configuring symbols. As described further below, the configuring symbols are selected by a two-stage process of first selecting a weight table, and second selecting a configuring symbol in accordance with the selected weight table.

Any credit prize appearing during the free games is instantly awarded.

Progress toward the award of each awardable prize (such as progressive jackpots, bonus prizes or a mixture of progressive prizes and bonus prizes) is indicated by displaying the names: "GRAND", "MAJOR", "MINOR", and "MINI" with letters yet to have been selected greyed-out and letters that have been selected in color.

If a letter is selected from the reel strips, it is counted towards spelling one of the progressive names. When the name of the progressive is completely collected, the respective progressive is awarded.

In an example, there are tables for each of the "GRAND", "MAJOR", "MINOR", and "MINI" prizes. As described in further detail below, the tables are used "without replacement" and contain a set of undetermined, reference letters as well as credit prizes.

For example, the "GRAND" table contains reference letters "GRAND_1", "GRAND_2", "GRAND_3", "GRAND_4", and "GRAND_5", each with a unique weight. At the start of Feature 3, these reference letters are randomly (even chance) assigned a letter corresponding to the progressive level by processor 204. For example, "GRAND_1", "GRAND_2", "GRAND_3", "GRAND_4", and "GRAND 5" will be randomly assigned one of "G", "R", "A", "N", or "D" letters for the remainder of Feature 3.

After any prize is awarded the progress indicated by the prize name is reset by the processor (here by greying all the letters out) and the prize can potentially be won again during the remainder of the feature. Weight tables are reset if all configurable symbols within the weight table have been used.

A further feature cannot be triggered during this feature.

Composite (or "Super") Feature 1 Derived from Feature 1+Feature 2

A number of game play characteristics of Feature 1 are incorporated into Super Feature 1, including that 5 free games are awarded, the number of symbols selected for each column of symbol positions grows to 6 symbol positions high and 100 lines are played. Further, if a WILD symbol appears in any position on reels 2, 3, 4, and/or 5, the reels are nudged so that all symbols on that reel become WILD symbols. A number of characteristics from Feature 2 are incorporated too. Specifically, every SCAT 2 that appears during the feature awards 1 free game, 2 free games, or a bonus credit prize as described above. Further, a multiplier is applied to all line wins during the feature. The value of the multiplier is 3. An additional feature game may be triggered from Super Feature 1.

Composite (or "Super") Feature 2 Derived from Feature 1+Feature 3

When Super Feature 2 is awarded, 10 free games are awarded (from Feature 3). SCAT 1, SCAT 2, and SCAT 3 are replaced by GOLD SCAT during this feature (from Feature 3) and each column grows 6 symbol positions high and 100 lines are played (from Feature 1).

As in Feature 1, if WILD appears in any position on reels 2, 3 4 and/or 5, the reels are nudged so that all symbols on that reel become WILD. Further, line wins are multiplied by 3.

As in Feature 3, each GOLD SCAT appearing has a configuring symbol which is either a credit prize or a letter "M", "I", "N", "A", "J", "O", "R", "G", "N", and "D", which is a component of a prize that can be awarded if all letters are collected in the manner described above.

Composite (or "Super") Feature 3 Derived from Feature 2+Feature 3

In Super Feature 3 10 free games are awarded. As described in relation to Feature 3, SCAT 1, SCAT 2, and SCAT 3 are replaced by the configurable symbol GOLD SCAT and each GOLD SCAT appearing is configured by a configuring symbol which is either a credit prize or a letter M", "I", "N", "A", "J", "O", "R", "G", "N", and "D", that is a component of a prize that can be collected.

As with Feature 2, line wins are multiplied by 3. A further feature cannot be triggered during this feature.

Composite (or "Mega") Feature 4 Derived from Feature 1, Feature 2 and Feature 3

Ten (10) free games are awarded. The game play characteristics from Feature 1 are that each column grows 6 symbol positions high and 100 lines are played.

The configurable GOLD SCAT symbol and prize component collection characteristics from Feature 3 are incorporated too. As in Feature 1, if WILD appears in any position on reels 2, 3, 4, and/or 5, the reels are nudged so that all symbols on that reel become WILD. Further, line wins are multiplied by 3. A further feature game cannot be triggered during the Mega Feature.

Figure 6:
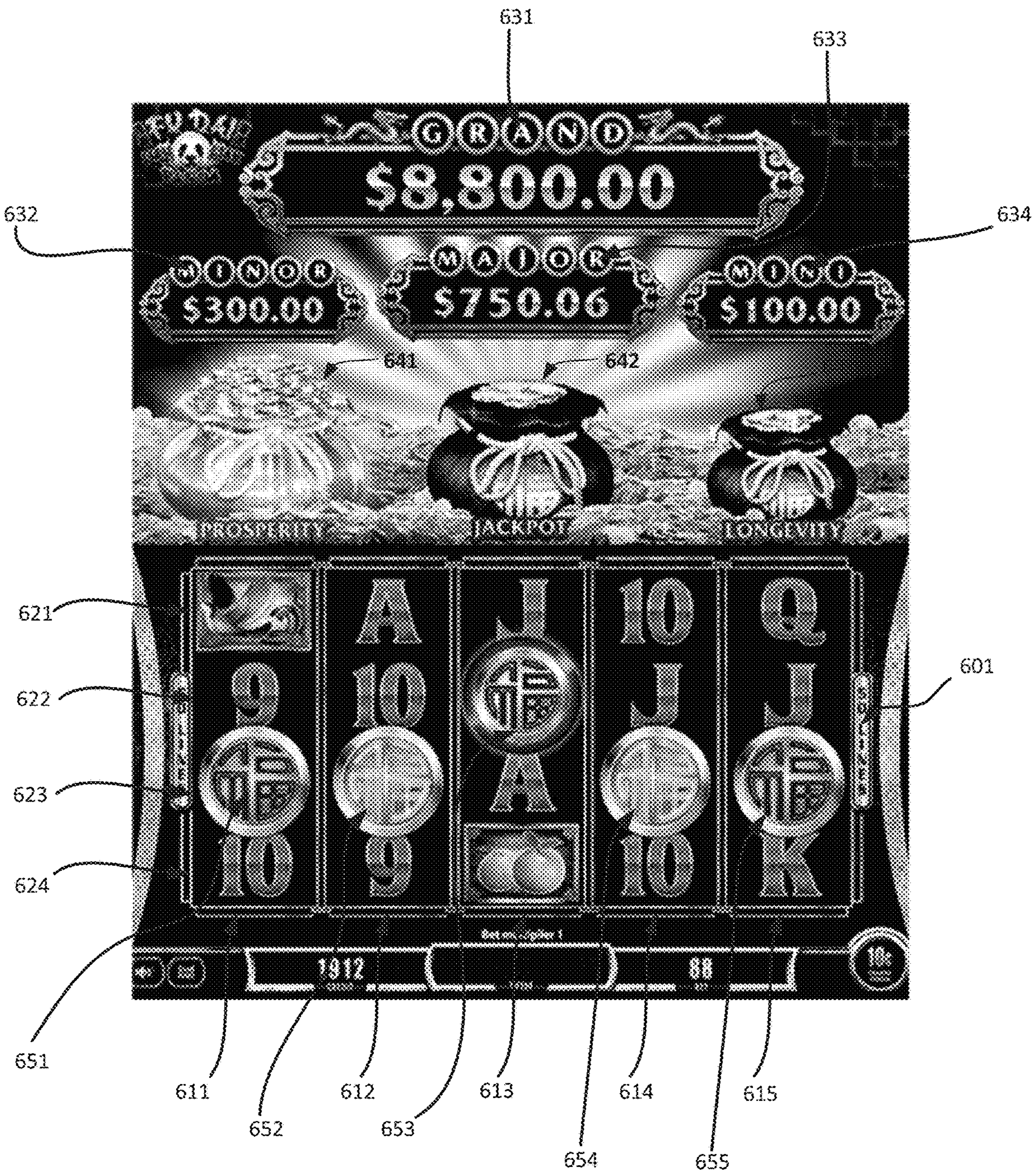
FIGS. 6, 7, 8, and 9 are example screen displays.
Figure 7:
Figure 8:

FIGS. 6, 7, and 8 are example screen displays during a process of a composite feature being triggered as a result of processor 204 carrying out steps 540 to 570 of FIG. 5. In this example, Composite Feature 4, the "Mega" Feature game, is triggered.

FIG. 6 shows an example screen display of the base game. Symbols are selected for twenty symbol positions arranged in five columns 611-615 and four rows 621-624. Screen display has an indicator 601 to indicate that the player is playing 50 lines. In an upper part of the screen display, current values are displayed for a GRAND progressive jackpot 631, a MAJOR progressive jackpot 632, a MINOR bonus prize 633 and a MINI bonus prize 634.

Bags 641, 642, 643 of coins correspond to a Prosperity Feature, Jackpot Feature, and Longevity Feature, respectively. The size of the bag is indicative of how many trigger symbols have appeared since the respective feature was last triggered.

In one example, each of the bags 641, 642, 643 has five possible states as set out in Table 2.

TABLE 2

| State of bag | BAG 641 | BAG 642 | BAG 643 |
|---|---|---|---|
| 1 | 0-4 | 0-4 | 0-4 |
| 2 | 5-9 | 5-9 | 5-9 |
| 3 | 10-14 | 10-14 | 10-14 |

TABLE 2-continued

| State of bag | BAG 641 | BAG 642 | BAG 643 |
|---|---|---|---|
| 4 | 15-24 | 15-24 | 15-24 |
| 5 | 25+ | 25+ | 25+ |

In the screen display of FIG. 6, five trigger symbols 651, 652, 653, 654, 655 have landed. In an example, the trigger symbols are color coded to enable them to have a common appearance yet be associated with the respective feature games. In one example, SCAT 1 symbols 652, 654 associated with the Prosperity Feature are green in color and the Prosperity Feature bag 641 is also green in color. SCAT 2 symbols 651, 654 associated with the Longevity Feature are purple in color and the Longevity Feature bag 643 is also purple in color. SCAT 3 symbol 653 associated with the Jackpot Feature is red in color and the Jackpot Feature bag 642 is also red in color. As all three trigger symbols have landed, the processor 204 uses the set of probabilities associated with the occurrence of all three feature, and in this case evaluation of the trigger probabilities results in the Mega Feature being triggered.

As each trigger symbol is displayed, an animation indicates to the player that they have a chance to trigger a feature game by showing the relevant trigger symbol as being added to the bag associated with the trigger symbol. FIG. 7 illustrates an example, of a SCAT 1 symbol 752 landing in the second column and a pair of images of the SCAT 1 symbol 752A, 752B moving towards the Prosperity Feature bag 641.

In FIG. 8, a message 810 is displayed with the text "MEGA FEATURE WON! 10 FREE GAMES. Grow reels and nudge WILDs! <GOLD COIN> (the "GOLD SCAT" symbol) awards additional free games or credit prizes! Collect and win Jackpots! PRESS START FEATURE."

Figure 9:
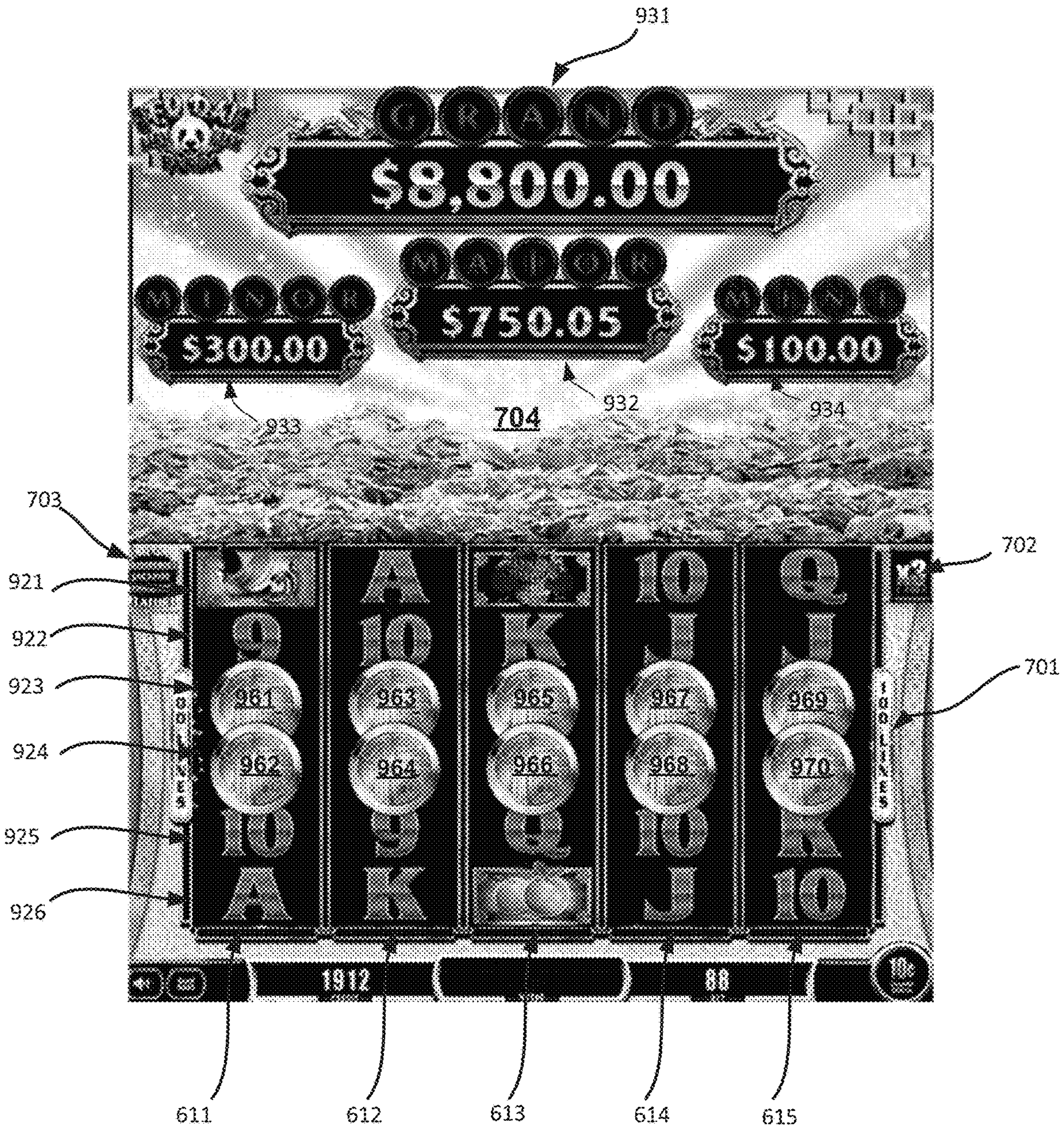

FIG. 9 shows an initial screen of the Mega Feature. As the reels have "grown" or expanded, there are now six symbol positions in each column 611-615 of symbol positions arranged in 6 rows 921-926. In the upper part of the display, a current status is displayed for each of the GRAND prize 931, MAJOR prize 932, MINOR prize 933, and MINI prize 934. In FIG. 9, each of the current statuses is an initial status where all of the letters of a respective prize status are greyed out to indicate to the player that none of the component symbols of the respective prize (here the letters of the name of the prize) has been collected. Background 704 has been changed from a base game background to a gold background to indicate that the player is playing the Mega Feature. A first indicator 701 indicates to the player that 100 pay lines are now active. A second indicator 702, indicates that a "×3" multiplier is active, and a third indicator 703 indicates that the Mega Feature is active. In other examples, the component symbols could be representative of a non-cash prize, for example, four parts of a car that if collected award a car as a prize.

Ten configurable symbols 961-970 are shown in an unconfigured state to indicate to the player that configurable symbols will be part of play of the Mega Feature.

While in the above examples each Super or Mega Feature incorporates game play characteristics of other feature(s), it should be appreciated that a Super or Mega feature need not include game play characteristics of other feature(s). A Super or Mega feature may be a completely different feature that includes no game play characteristics of other feature(s).

Figure 10:
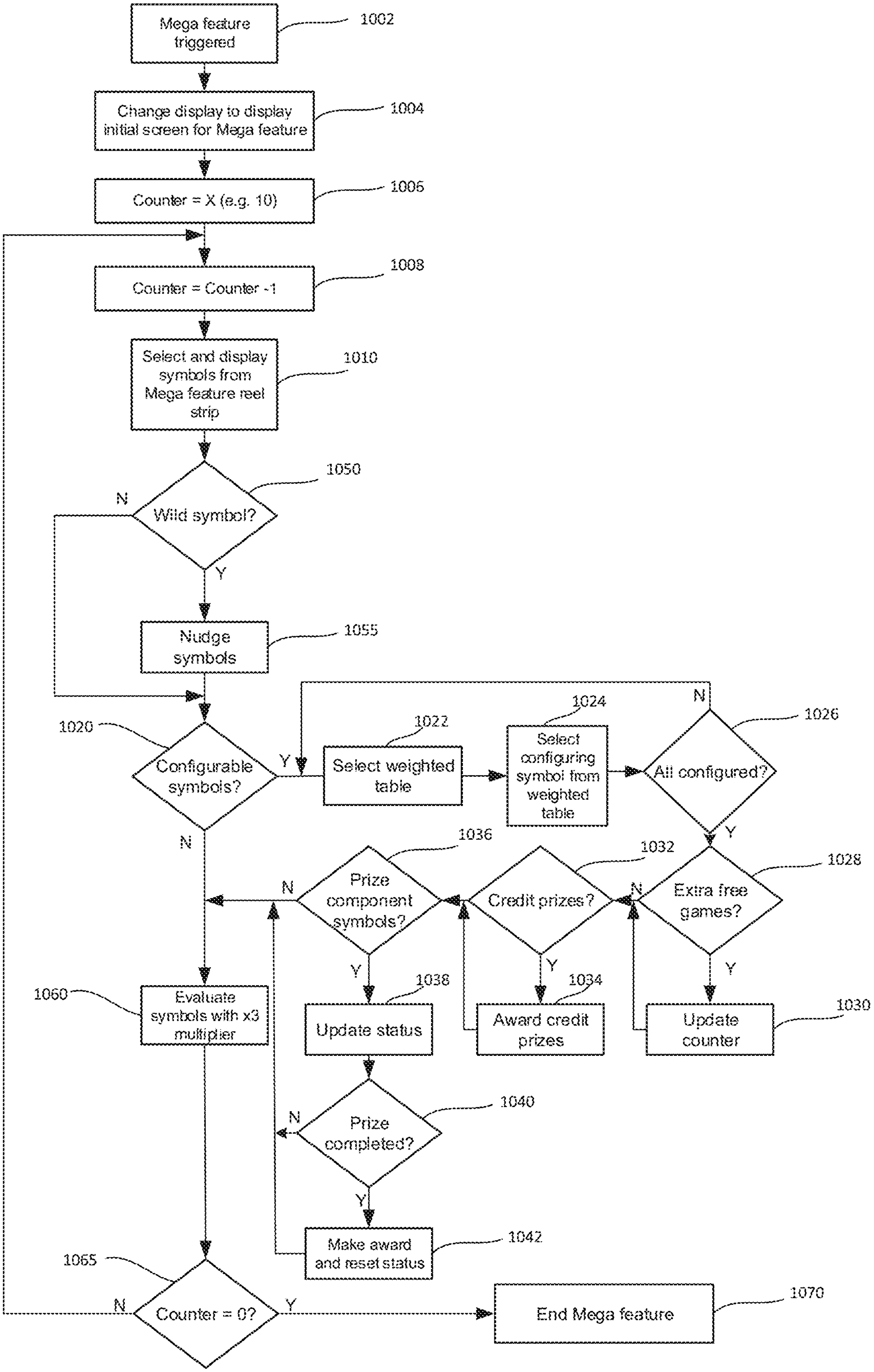
FIG. 10 is a flow chart of an embodiment.

Referring to FIG. 10, there is shown a method 1000 of conducting the Mega Feature. At step 1002 the Mega Feature is triggered. This is as a result of the processor 204 carrying out step 560. The gameplay characteristics of the Mega Feature are outlined above. It will be appreciated that an understanding of how the other features, or composite features, are conducted can, in part, be gained by reference to FIG. 10, in particular, by considering those parts of the flowchart of FIG. 10 which are relevant to the specific feature or composite feature.

At step 1004, the processor 204 changes the display 240 to display the initial screen for the Mega Feature (in an example, to the screen display shown in FIG. 9).

At step 1006, the processor 204 sets a counter in order to keeping track of the free games to an initial value. In this example, the processor 204, sets the counter to ten free games.

At step 1008, the processor begins conduct of the first free game by decreasing the counter by one.

At step 1010, the processor selects symbols from the Mega Feature reel strips. As described above, the Mega Feature symbol reel strips are modified relative to the base game reel strips shown in FIG. 3. In one example, in order to implement the modification, the processor retrieves a specific set of reel strips for the Mega Feature, which are stored separately in memory 208 to the base game reel strips shown in FIG. 3. In this respect, the reel strips for the "Mega Feature" can also have additional differences to the base reel strips.

A set of Mega Feature reel strips 1100 are shown in FIG. 11 to indicate an example of differences between the Mega Feature reel strips 1100 and the base game reel strips. As with the reel strips shown in FIG. 3, the length of the reel strips and the symbols thereon are illustrative only. In particular, the reel strips for the Mega Feature can be of a different length to the base game reel strips. As illustrated in FIG. 11, there are five reel strips 1121-1125 and fifteen reel strip positions, 1101-1115. Instead of the individual scatter symbols associated with particular feature games, there are "GOLD SCAT" symbols on each of the reel strips. As will become apparent from the example screen displays described below, the GOLD SCAT symbols initially bear no indicia and hence can be thought as configurable symbols. These configurable symbols are initially displayed in unconfigured state when selected and then configured by selecting a configuring symbol (in some examples, the processor 204 may begin selecting the configuring symbols once the processor 204 has selected the configurable GOLD SCAT symbols and before they have been displayed. The reel strips also include stacks of WILD symbols as exemplified by stack 1155 of six WILD symbols. In an example, the reel strips are longer than the fifteen reel strip positions shown and there is at least one stack of WILD symbols on each of reels 1122-1125.

The process of selecting symbols from the reel strips of FIG. 11 conducted at step 1010 is the same as that outlined in relation to FIG. 4 above, except that six contiguous symbols will be selected from each reel strip for display in the six symbol positions of each column as outlined in FIG. 9. The processor 204 then controls display 240 to display the selected symbols at the display positions.

Figure 12:
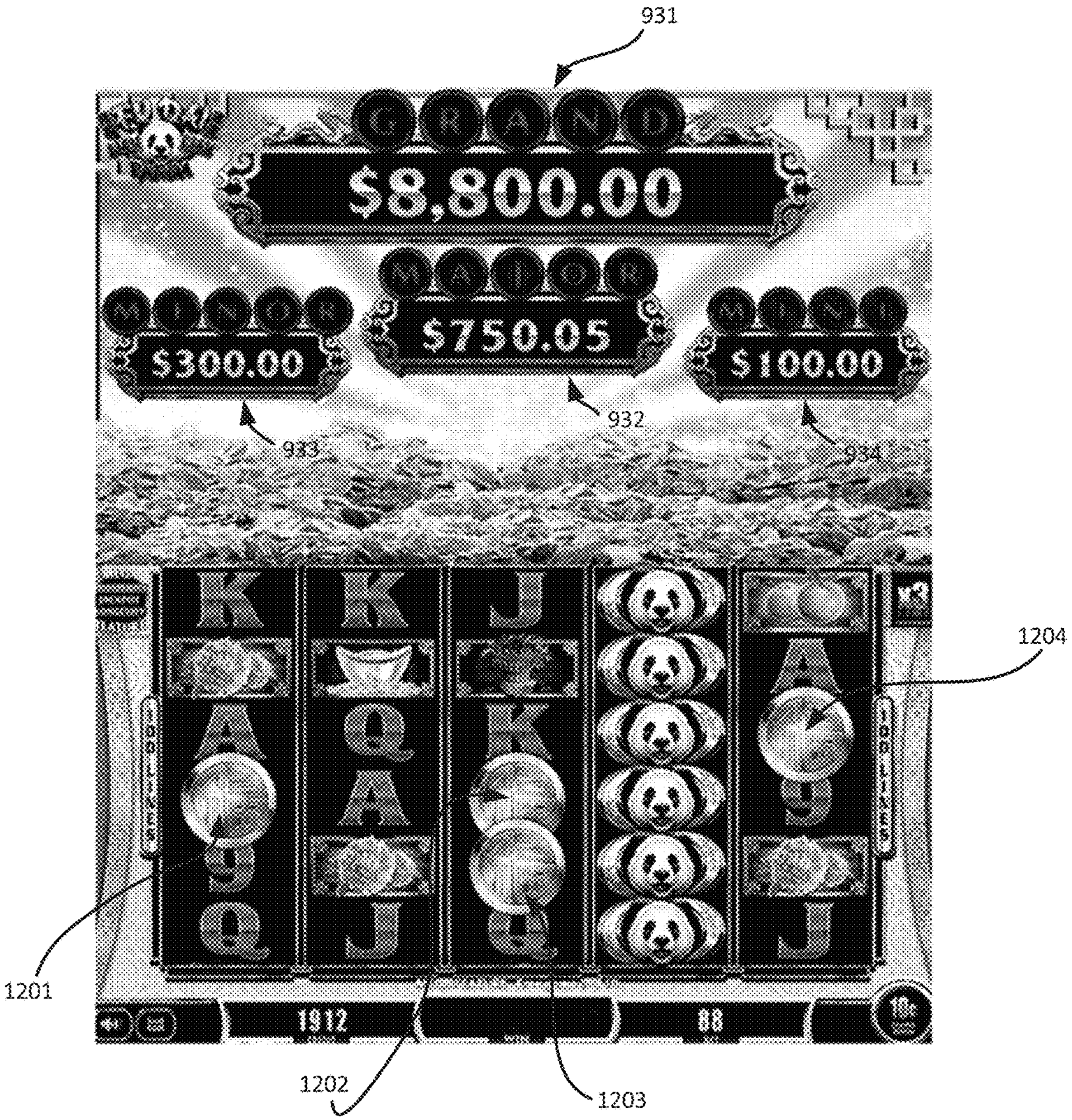
FIGS. 12, 13, 14, 15, 16, 17, 18, 19, 20, 21, 22, 23, 24, and 25 are example screen displays.

At step 1020, the processor determines whether any of the selected symbols are configurable symbols. Examples of the configurable symbols shown in an unconfigured state are shown in FIG. 12 where symbols 1201, 1202, 1203 and 1204 are unconfigured configurable symbols. In this example, the configurable symbols are referred to as GOLD SCAT symbols because they are originally displayed as gold coins and they are evaluated irrespective of whether they are on a pay line.

As shown in FIG. 12, the player can win one or more of four prizes. Indeed, as explained in further detail below, the player can also win a particular prize more than once. Current statuses are shown for each prize. In FIG. 12, as with FIG. 9, these are shown in an initial state where no progress has been made towards winning the jackpot prize. When there are one or more configurable symbols, the processor 204 selects a weighted table from memory 208 to apply to this instance of configuring a configurable symbol. In this example, there are four weighted tables corresponding to each of the prizes. Each of the weighted tables has each of the letter of the respective prize (e.g. the letters "G", "R", "A", "N", and "D" for the GRAND prize) and other symbols that relate to the award of further free games or credit prize awards. The selection of a weighted table is weighted by the processor 204 using a further weighted table at step 1022 to determine which weighted table is selected in order to control the relative probability of one of the particular prize tables being used. In an example, the weighted table for selecting the prize letter weighted table, is such that selection of the lower prize letter tables is more likely than the higher prize letter tables. In order to select a prize letter weighted table, the processor obtains a number from RNG 212 and compares it to a range of values corresponding to the relative probabilities of selecting the particular weighted tables. The generated random number is matched by the processor 204 to a range and from this the table is selected. The processor 204 then conducts, at step 1024, a similar process in order to select a configuring symbol from a weighted table for that prize. The process conducted by processor 204 at step 1024 similarly involves assigning ranges of values to respective ones of the configuring symbols by the letters of a prize, any credit prizes and any free game prizes, and obtaining a number from the RNG 212 to compare to these ranges in order to select the configuring symbols. A distinction is that once a symbol has been selected, it is "removed" from the table by the processor so that it cannot be selected again, for example by setting a flag that the symbol has been selected. This ensures that, for example, in the case of MAJOR prize 932, that the letter "J" can only be selected once. As a result, each time a configurable symbol is configured with a letter, this will result in one of the prize statuses being updated.

At step 1026, the processor determines whether all configurable symbols selected in this free game have been configured and if not, the processor 204 reverts to step 1032.

Upon it being determined by the processor 204 at step 1026 that all the configurable symbols have been configured, the processor 204 proceeds to step 1028 and determines whether any of the symbols correspond to the award of one or more extra free games. That is if a configurable symbol has been configured with a free game symbol, the processor updates the counter at step 1030 to reflect the additional free game(s).

At step 1032, the processor 204 determines whether the configurable symbols have been configured with any credit prizes and, if there are, makes an award of the credit prizes by adding them to a win meter in memory 208 at step 1034.

At step 1036, the processor 204 determines whether any of the configurable symbols includes prize component symbols (i.e. the letters of a prize). If they do, at step 1038, the processor 204 updates the status of the relevant prize. In order to distinguish between the letters of the different prizes, each of the letters are in a different color so that when a letter is shared by the prizes, such as is the case with the letter M, the player can readily appreciate which prize will be updated. In one example, the GRAND prize letters are red, the MAJOR prize letters are green, the MINOR prize letters are blue and the MINI prize letters are yellow.

At step 1040, it is determined whether any prizes have been completed by the processor 204 determining whether the defined set of prize component symbols (here, the letters of a particular prize) have been collected. If a prize has been completed, at step 1042, the processor 204 makes an award by adding the award amount to the win meter and resets the corresponding one of the statuses. At this stage, the processor 204 also resets the weighted table associated with the completed prize so that all symbols can be selected from the weighted table. In this way, it is possible for the player to collect the defined set of prize component symbols of a particular prize again, after it has been awarded, thereby providing an additional chance of winning the prize. Further, different ones of the four prizes can be completed within the free game series, or even during the same free game of the free game series.

FIGS. 12, 13, 14, 15, 16, 17, 18, 19, 20, 21, and 22 illustrate the process of steps 1020-1042, in more detail by giving an example of the graphical representations accompanying the process conducted by processor 204.

Figure 23:
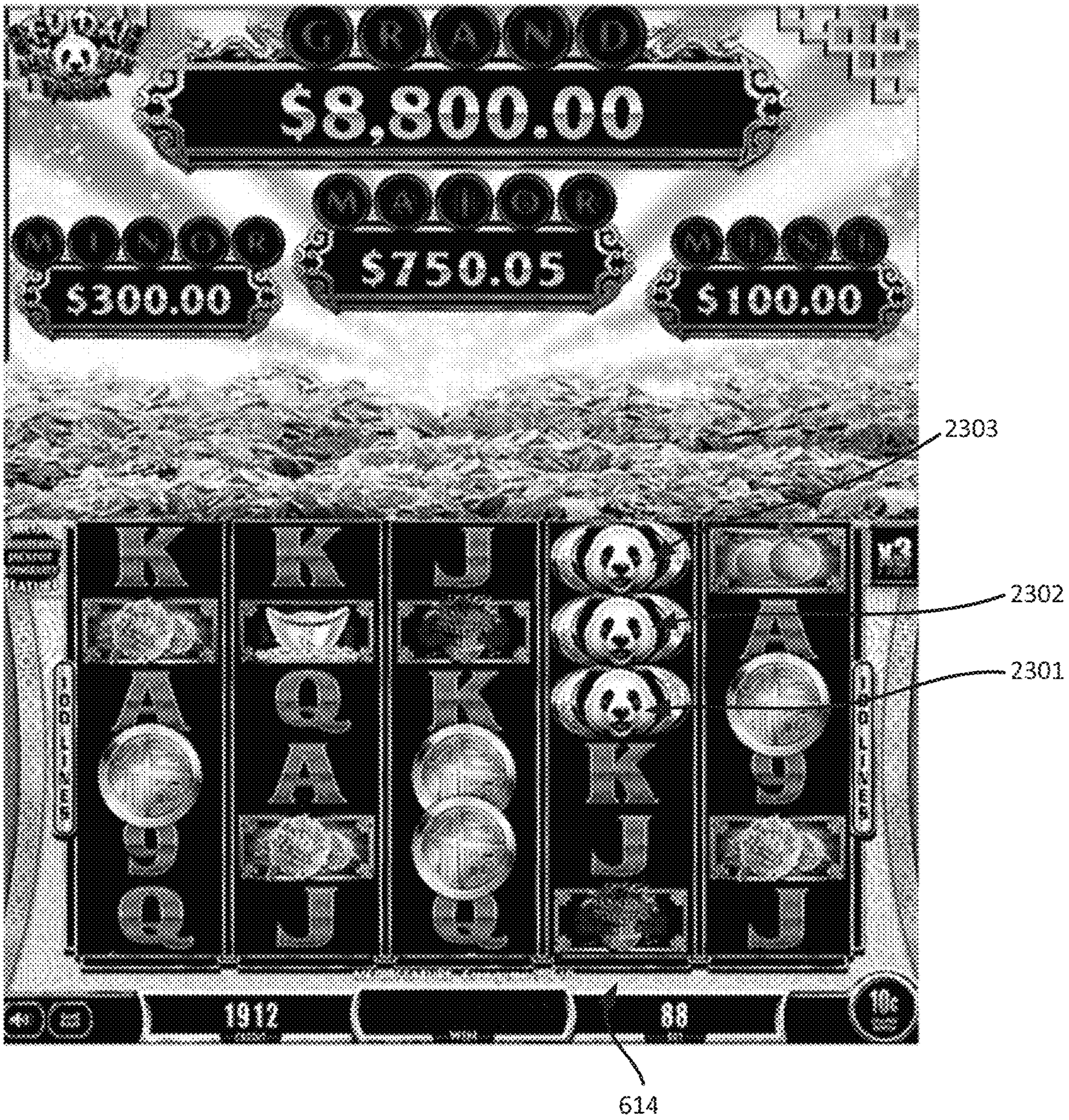
Figure 24:
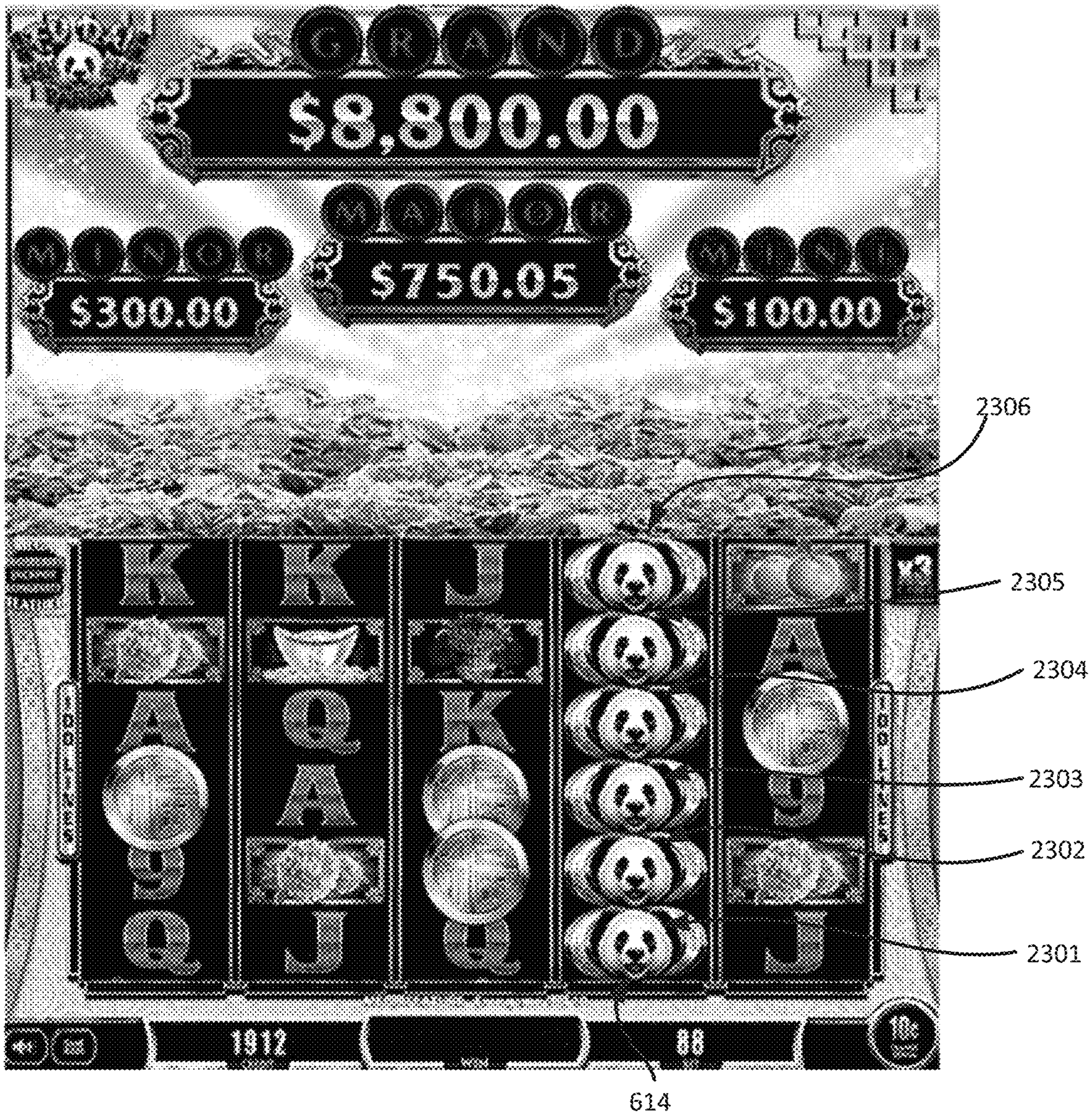

At step 1050, the processor 204 determines whether any WILD symbols have been selected for display. At step 1055, if one or more columns of symbols include a WILD symbol, the symbols are nudged so that an entire stack of six WILD symbols are displayed at the symbol positions. An example of this process is shown in FIGS. 23 and 24 where initially three WILD symbols 2301, 2302, 2303 are displayed in the fourth column 614 of symbol positions. As shown in FIG. 24, the position of the fourth reel strip has been adjusted by moving it so that there are now six WILD symbols 2301-2306 in the fourth column 614.

In one example, any stack of WILD symbols is sufficiently spaced from a configurable symbol so that they cannot appear at the same time in order to avoid a configurable symbol being nudged off the reels. In an alternative example, a configurable symbol may be nudged off a reel. In a further alternative example, any configurable symbols that appear are configured with configuring symbols and the prize status is updated by the processor 204 prior to conducting the process of nudging the symbol.

Figure 13:

As indicated above, in the example shown in FIG. 12 there is a first free game in which configurable symbols 1201-1204 have been selected. Referring to FIG. 13, a first of these configurable symbols has been configured with the "R" prize component symbol to produce configured symbol 1201A. In this example, the configured "R" symbol belongs to the GRAND prize and is colored red.

Figure 14:

In FIG. 14, a second of the configurable symbols 1202A has been configured with a yellow "M" prize component symbol corresponding to the MINI prize 934. In FIG. 14, there is also an animation 1021B of the "R" prize component symbol moving towards the GRAND prize.

Figure 15:

In FIG. 15, an updated GRAND prize status 931A is displayed with the letter "R" 1501 within the word "GRAND" changing to indicate that a portion of the prize has been collected. In this way, progress toward completing the entirety of the prize is displayed to the player.

Figure 16:

In FIG. 16, a further configurable symbol 1203A has been configured with the green letter "A" corresponding to the MAJOR prize 932. FIG. 16 also shows an animation of the yellow letter "M" 1202B moving towards the MINI prize 934.

Figure 17:
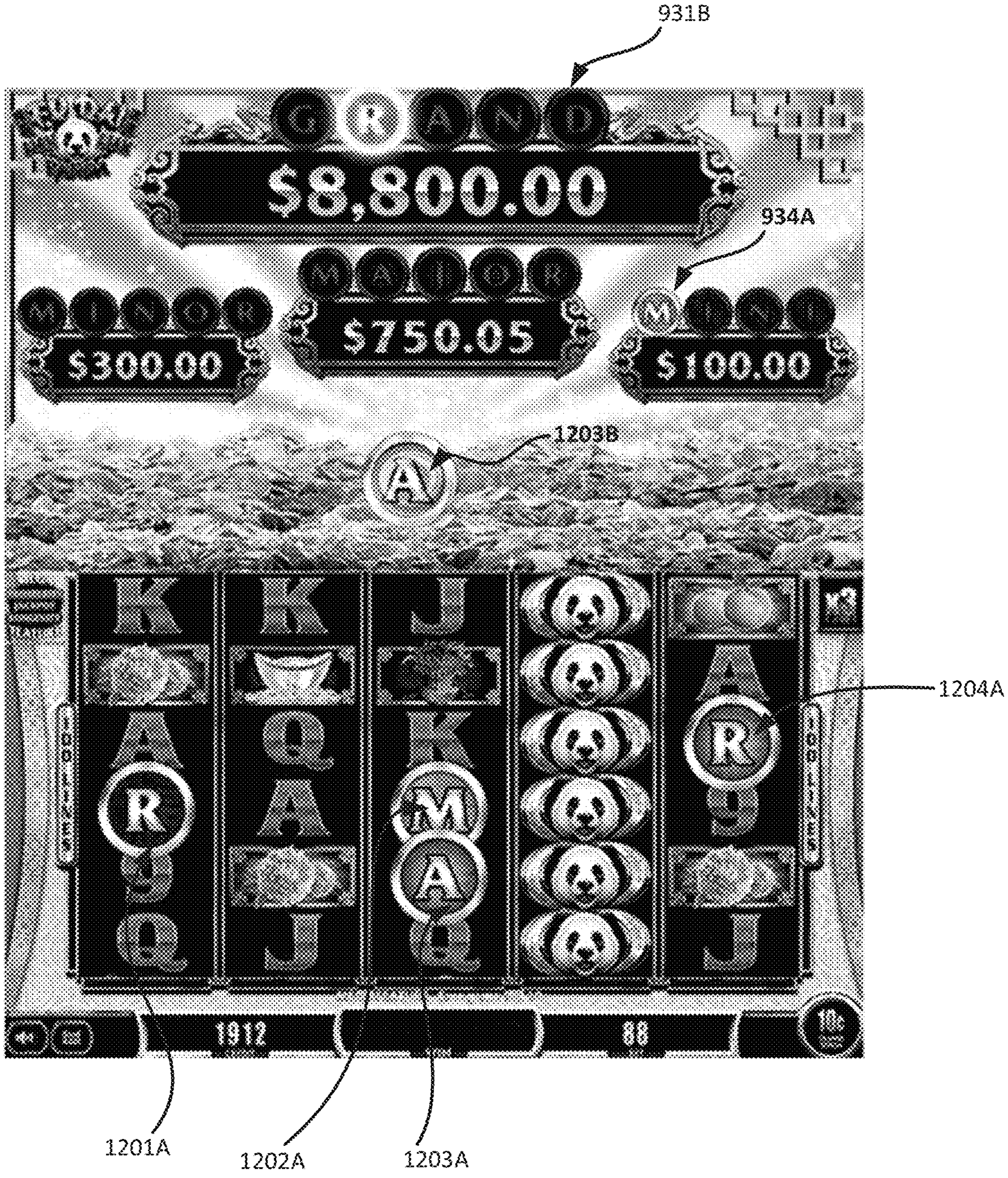

FIG. 17 shows that the fourth configurable symbol has been configured to include a green letter "R" corresponding to the MAJOR prize. FIG. 17 also shows an animation of the green letter "A" 1203B towards the MAJOR prize 932.

Figure 18:
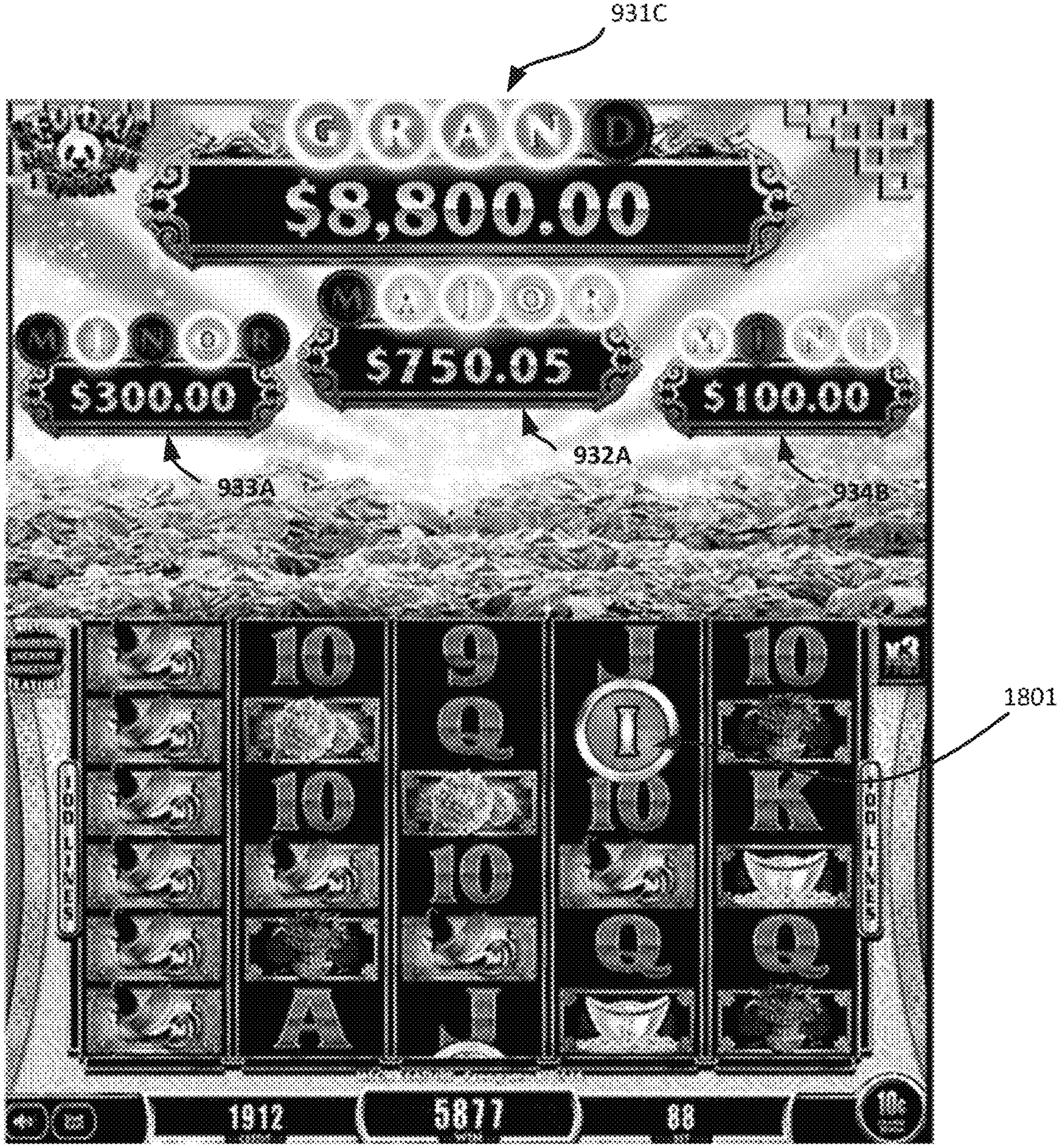

FIG. 18 is a screen display at a later stage of the game. At this stage of the game, the GRAND prize status 931C is that letters "G", "R", "A", and "N" have been collected, representing four prize component symbols of the set of possible five prize component symbols required to complete the GRAND prize. Similarly, the letters "A", "J", "O", and "R" of the MAJOR prize have been collected as indicated by MAJOR prize status 932A, representing four prize component symbols of the five prize component symbols required to be collected in order to be awarded the MAJOR prize. MINOR prize status 933A shows that the letters "I" and "O" have been collected. Finally, MINI prize status 934B indicates that the letters "M", "N", and "I" have been collected and that one additional "I" prize component symbol is required in order to complete the MINI prize. As also shown in FIG. 18, a further configurable symbol has been selected and has been configured with the yellow letter "I" prize component symbol corresponding to the MINI prize.

Figure 19:
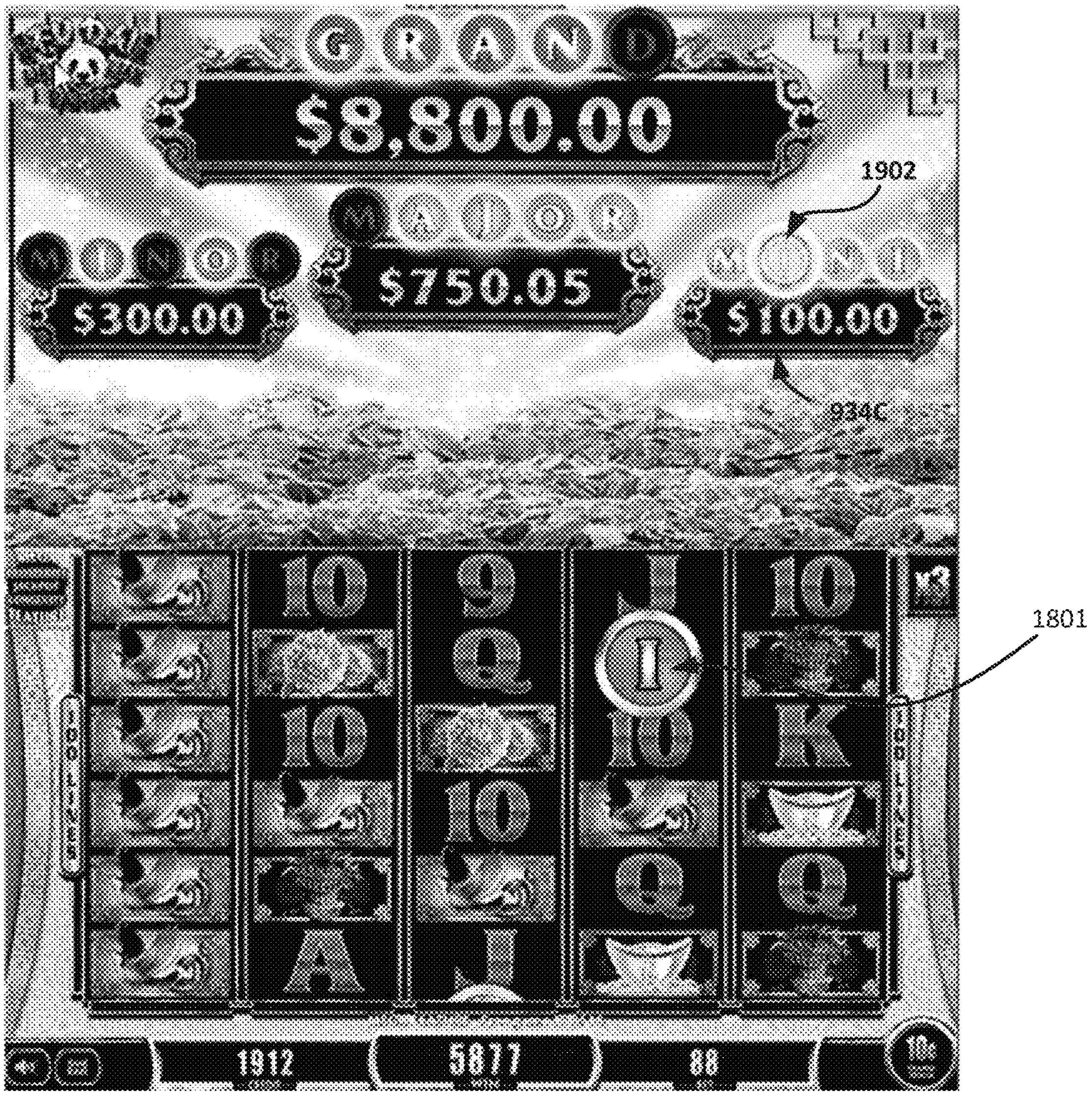

As shown in FIG. 19, MINI prize status 934C is updated by animating yellow letter "I" symbol 1902 within MINI prize status 934C.

Figure 20:

FIG. 20 shows that following completion of the award, a completed MINI prize 934D is shown and a prize award message 2010 is displayed to indicate to the player that they are a "mini bonus winner" and that the prize has a value of "$100".

Figure 21:

Referring to FIG. 21, after the prize is awarded, the MINI prize 934 is reset to its initial status, while GRAND prize status 931C, MAJOR prize status 932A, and MINOR prize status 933A remain unchanged. For example, in a subsequent free game, a configurable symbol is selected and configured with the orange letter "D" prize component symbol corresponding to the GRAND prize, the GRAND prize will be awarded, in addition to the earlier award of the MINI prize within the free game series. As another example, if in the same subsequent free game, a further configurable symbol is selected and configured with the green letter "M" prize component symbol corresponding to the MAJOR prize, the MAJOR prize is further awarded during the same free game.

Figure 22:

FIG. 22 shows a subsequent free game where a further yellow letter "I" prize component symbol 2201 has been used to configure a selected configurable symbol resulting in the update of the MINI prize status 934E to indicate that one of the "I" letters has been selected.

In this respect, it will be apparent from a comparison of FIG. 22 and FIG. 18 that the specific configurable symbols are also associated with specific positions within the prize where a letter is repeated. That is, when a letter "I" is selected in the MINI prize, it will be displayed at a specific position in this example.

Referring again to FIG. 10, subsequent to the completion of the Jackpot Feature sub-process of the Mega Feature, at step 1060, the processor 204 evaluates symbols on win lines (in this example, 100 lines) using a pay table stored in memory 208 and by applying a three times multiplier. Any awards for winning combinations are made to a win meter in memory 208.

At step 1065, the processor 204 determines whether the counter has reached zero and if not, reverts to step 1008 to conduct a further free game. Once the counter reaches zero, the processor 204 proceeds to step 1070 of ending the Mega Feature game. In some examples, at the end of the Mega Feature game, the processor 204 may control the display to display the total amount won during the Mega Feature.

Figure 25:
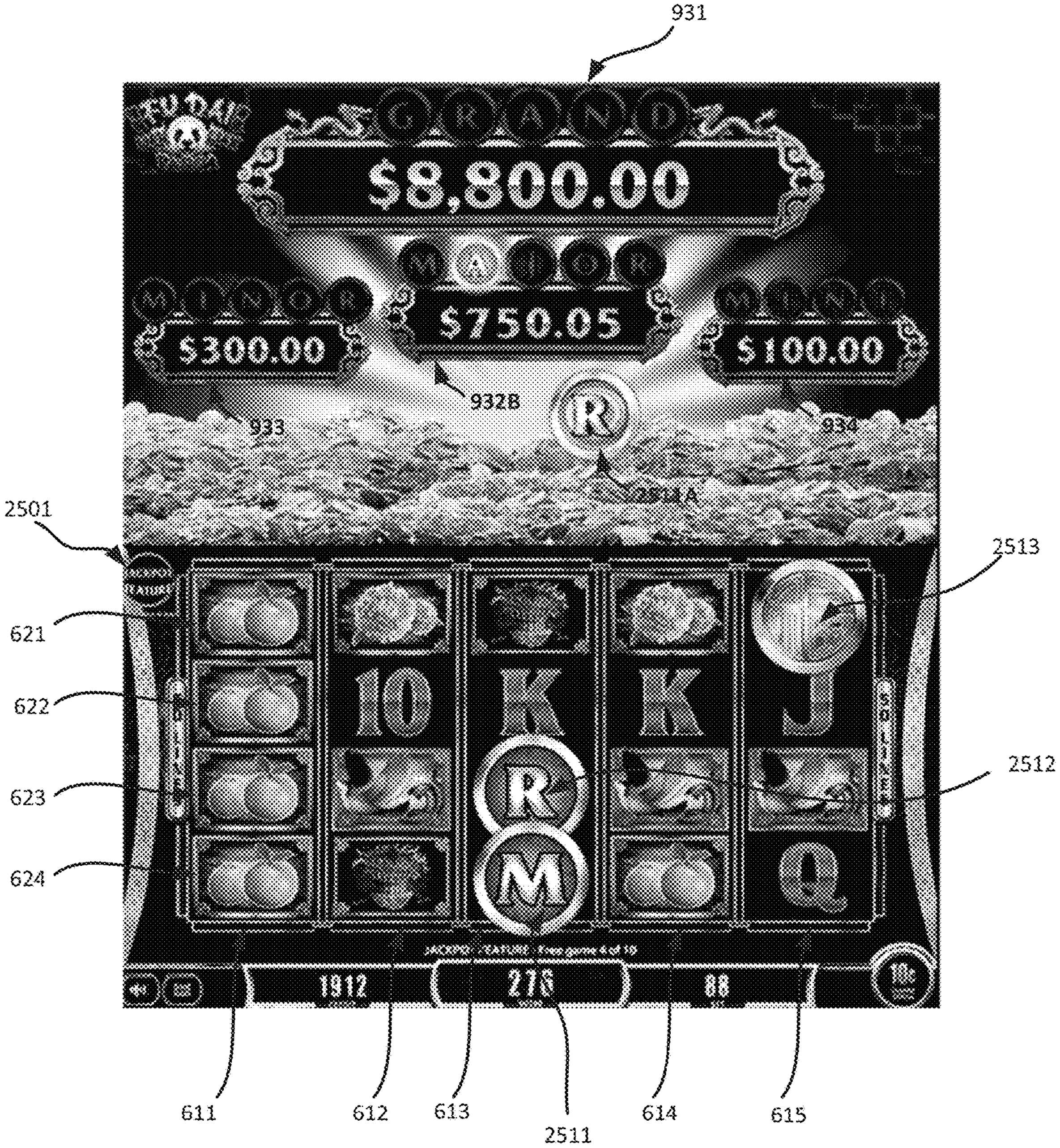

FIG. 25 illustrates an example of when the Jackpot Feature is conducted by itself to show some of the differences as compared to the Mega Feature. As shown in FIG. 25, there are twenty display positions arranged in five columns 611-615 and four rows 621-624. Indicator 2501 includes the text "Jackpot Feature" to indicate to the player that they are playing the jackpot feature. FIG. 25 illustrates that the GRAND, MINOR, and MINI prizes all have their initial statuses whereas the letter "A" has been collected towards the MAJOR prize status 932B. Two further configured configurable symbols 2511 and 2512 have been selected and configured during the 4th of the 10 free games as, respectively, letter "M" and letter "R". An animation of the letter "R" symbol 2511A is shown as moving towards the MAJOR prize. A further configurable symbol 2513 is yet to be configured. From FIG. 25, the skilled person will appreciate that a major difference during conduct of the standalone Jackpot Feature is that there are fewer symbol positions at which configurable symbols can be selected.

Figure 26:
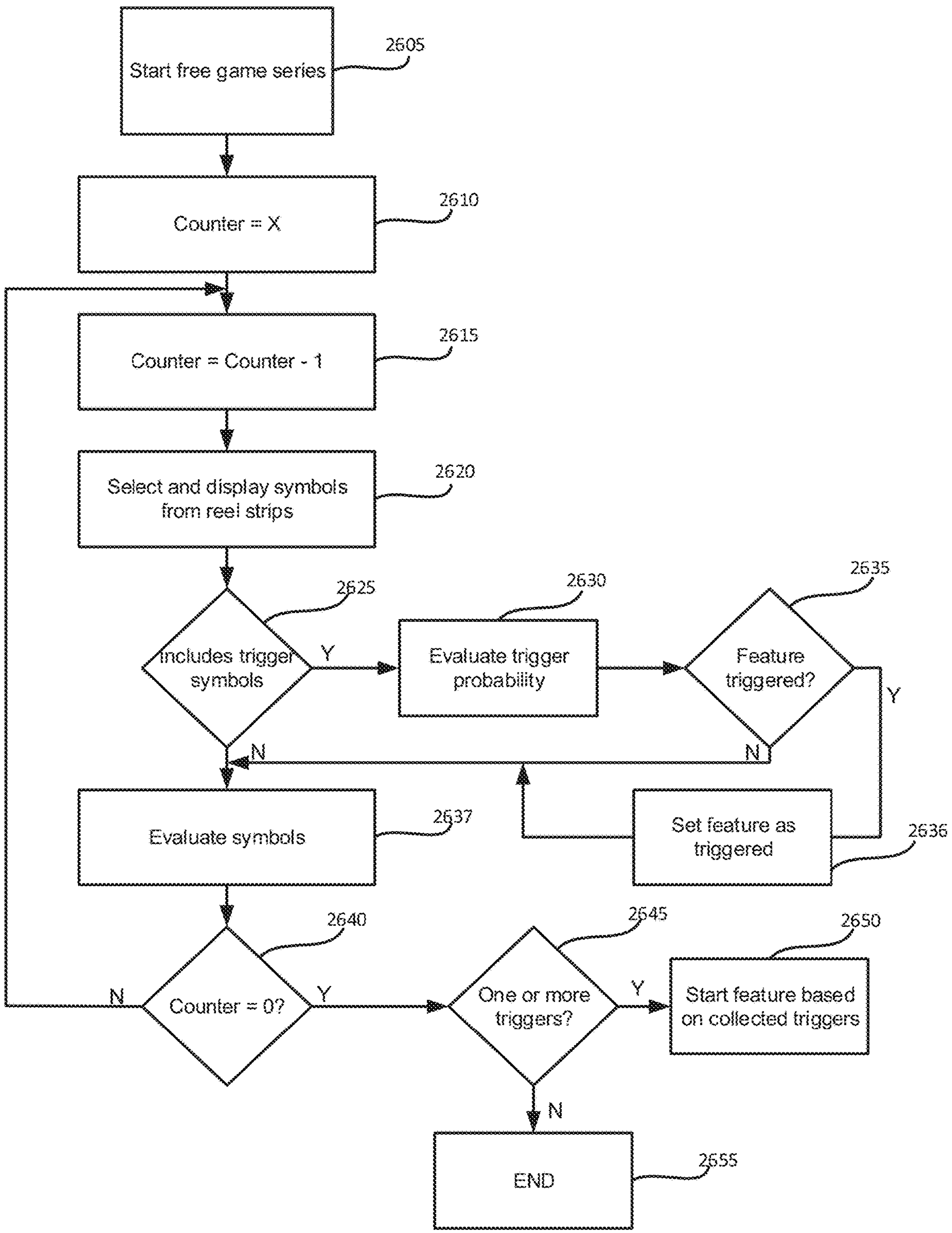
FIG. 26 is a flow chart of an embodiment.

FIG. 26 is a flowchart of a method 2600 for retriggering one or more feature games of an embodiment of the disclosure. In the example set of feature games described above, a feature game can be retriggered from each of the feature and composite feature games except triggering from the jackpot feature and the composite feature games that incorporate the jackpot feature. This is because when the jackpot feature is conducted (or game play characteristics of the Jackpot Feature are incorporated into a composite feature) there are no trigger symbols in the feature game. In this specific example composite feature 1 is the only composite feature that does not include the jackpot feature. An advantage of the method of FIG. 26 is that it enables a further composite feature to be triggered from within a feature game.

At step 2605, the processor 204 conducts a free game series which, in the example above, can be the five free games of the Prosperity Feature (feature 1), the five free games of the longevity feature (feature 2) or the five free games of the first composite feature which combines the play characteristics of features 1 and 2.

At step 2610, the processor sets a counter to an initial value of free games. In this example five free games.

At step 2615, the processor decreases the counter by one. At step 2620, the processor selects symbols from reel strip.

FIG. 27 shows one example set of reel strips 2700, which can be used in the Prosperity Feature. In this example, there are five-reel strips 2721-2725 and fifteen-reel strip positions are illustrated 2701-2715. The reel strips include three different trigger symbols for example SCAT 3 symbol 2741, SCAT 1 symbol 2742 and SCAT 2 symbol 2743. The symbols of the reel strips 2721-2725 also include stacks of symbols such as stack 2701.

The process of selecting symbols conducted at step 2615 is generally as outlined in relation to FIG. 4 above.

At step 2625, the processor 204 determines whether the selected symbols include one or more trigger symbols. If the selected symbols include one or more trigger symbols, processor proceeds to step 2630 and evaluates a trigger probability associated with each trigger symbol. Assuming no features have been triggered, the processor 204 separately determines, for each appearing trigger symbol, whether to trigger the feature game which the trigger symbol is associated. To do so, the processor 204 obtains values from the RNG 212 and compares the obtained values to a range corresponding to the probability. In this example, once a feature has been triggered, any further occurrences of the trigger symbol are not evaluated.

At step 2635, the processor 204 determines whether a feature is triggered on the basis of the evaluation and if it is, at step 2636, the processor sets the feature as triggered. The processor 204 then proceeds to step 2637 of evaluating the symbols.

In the examples set of feature games described above, certain of the feature games, such as composite feature 1 and feature 2, every SCAT 2 symbol that appears during the feature game awards one free game, two free games, or bonus credit prize. Accordingly, the step 2637 of evaluating the symbols includes adding any bonus prize from the credit symbols and updating the counter to add any additional free game. The step of evaluating the symbols 2637 also comprises that determining whether any pay line has a winning combination specified in a pay table stored in memory 208. Where the feature game is the composite feature 1 or feature 2, a multiplier is applied to any line win. All wins are added by processor 204 to the win meter in memory 208.

At step 2640, the processor 204 determines whether the counter has reached zero and if not, the processor 204 reverts to carrying out step 2615. Once the counter reaches zero, the processor proceeds to step 2645 and determines whether there are one or more triggers. If there are not, the processor 204 ends the game at step 2655. If there are one or more triggers, the processor 204 starts a feature based on the triggered features 2650 that have been collected during the series of free games which will be a composite feature if two or more features are conducted.

FIGS. 28, 29, 30, 31, 32, 33 and 34 illustrate an example of this process in relation to a number of screen displays. In particular, the figures show how two triggers can be collected during the "Prosperity Feature" which lead to conducting a composite feature game that incorporates both the Prosperity and Longevity play characteristics. This is the feature game described as composite featured game 1 above.

Figure 28:
FIGS. 28, 29, 30, 31, 32, 33 and 34 are example screen displays.
Figure 29:
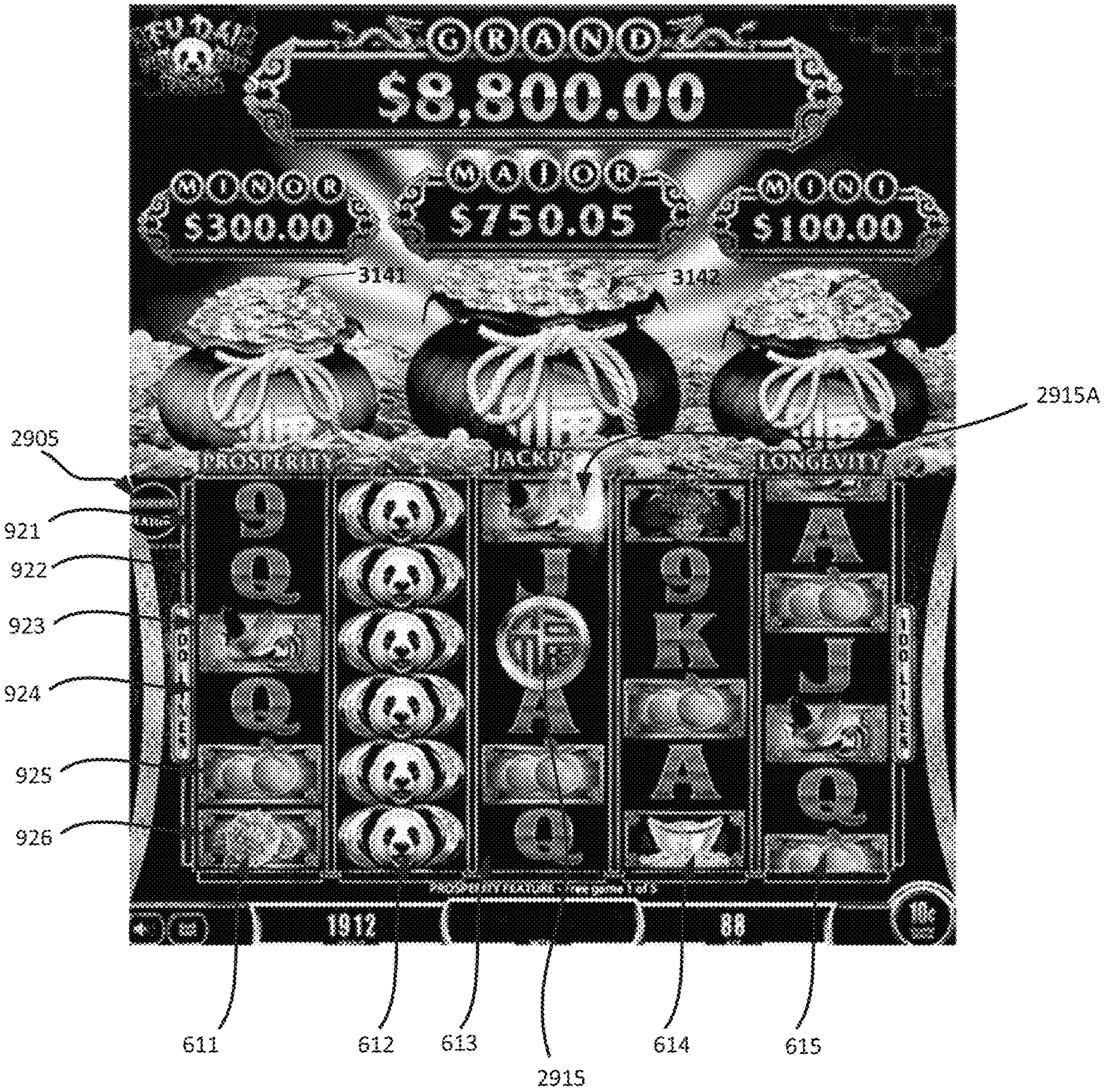

As shown in FIG. 28 when the Prosperity Feature game is triggered, a message 2805 is displayed with the text "Prosperity Feature won! Five free games. Grow reels and nudge WILDs! Press start feature" is displayed. As shown in FIG. 29, the processor 204 then changes the display screen to incorporate a layout similar to that shown in FIG. 9 where there are five columns 611-615 and six rows 921-926. Indicator 2905 indicates that the Prosperity Feature is in progress.

Figure 30:

As shown in FIG. 29, a SCAT 3 symbol 2915 corresponding to the Longevity Feature has landed and is being animated 2915A as moving towards bag 3143. Referring now to FIG. 30, in this instance, the appearance of the trigger symbol has caused a trigger probability to be evaluated and the feature to be collected. As a result, bag 3143 is updated to provide an updated representation 3143A of the bag with the underlying text "trigger collected" to indicate that the trigger for the Prosperity Feature has been collected.

Figure 31:
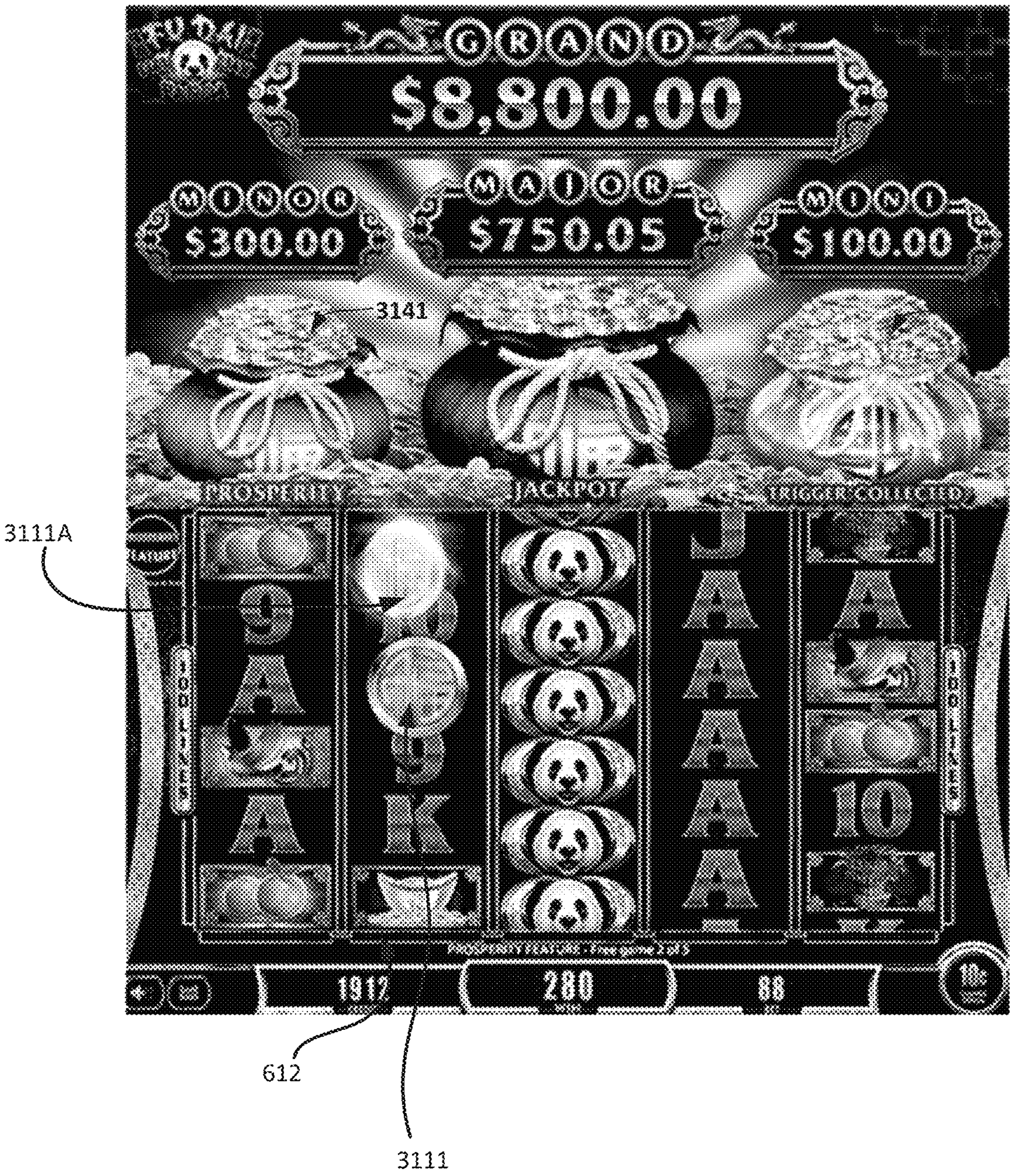

FIG. 31 shows a further trigger symbol 3111 (here a SCAT 1 symbol) has landed on the second reel 612 and is being animated 3111A as moving towards Prosperity bag 3141.

Figure 32:
Figure 33:

Again, in this example, the processor 204 has determined that this instance of appearance of the trigger symbol has resulted in the trigger being collected and as shown in FIG. 32 the representation of the bag 3141A is updated to show that the trigger for the Prosperity Feature has been collected.

Accordingly, at the end of the free games both the Prosperity trigger and the Longevity trigger have been collected and the processor 204 determines on that basis that it should conduct a composite feature game 1. Here, the Prosperity Longevity Super Feature (Super Feature 1 described above) the processor 204 controls the display 240 to display the message "Prosperity Longevity Super Feature won! Five free games. Grow reels and nudge WILDs! SCAT 2 symbol awards additional free games or credit prizes! Press start feature".

Figure 34:
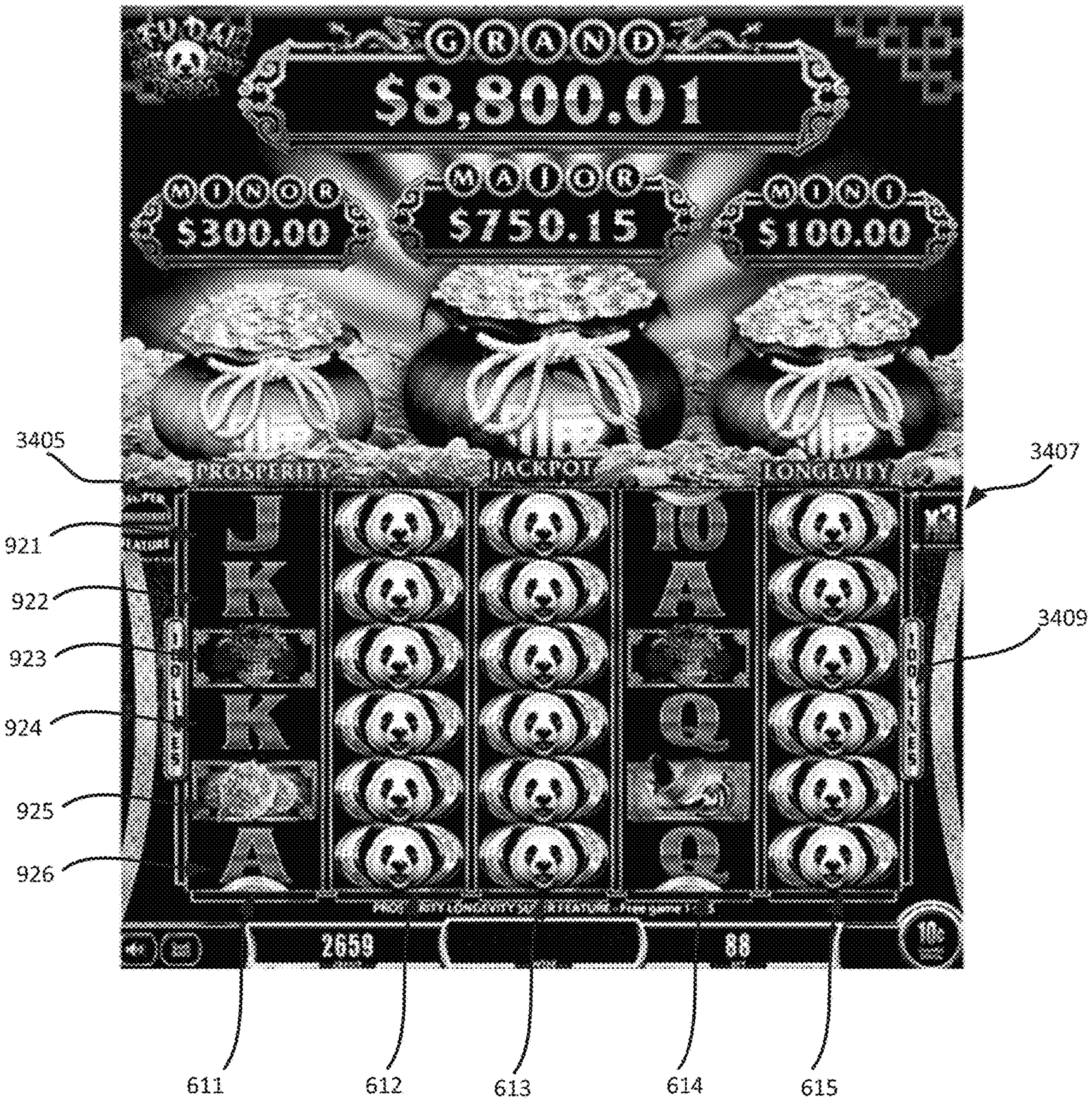

FIG. 34 shows an example of a screen layout for the Prosperity Longevity Super Feature. In this example, there are five columns 611-615 of symbol positions and here six rows 921-926. Indicator 3405 indicates that the player is playing the Prosperity Longevity Super Feature game. Indicator 3407 indicates that a three times multiplier applies and indicator 3409 indicates that one hundred lines will be evaluated.

Innovations described herein can be implemented in a server computers 102 and/or gaming device 104A, 104B, 104C, 104X, 200 described with reference to FIGS. 1 and 2. Thus, a server computer 102 or gaming device 104A, 104B, 104C, 104X, 200 is an example of an electronic gaming device as described with reference to FIGS. 1 and 2.

For example, for the electronic gaming device, a game controller such as the game controller 202 described with reference to FIG. 2 can perform operations to use a trigger symbol graphic, symbol collection graphic, bag graphic, symbol movement graphic, or symbol transformation graphic. In some example implementations, the game controller 202 can control display of a trigger symbol graphic, symbol collection graphic, bag graphic, symbol movement graphic, or symbol transformation graphic. In particular, the game controller 202 can, if the supplemental feature has been triggered in a feature game, control display of the trigger symbol graphic, symbol collection graphic, bag graphic, symbol movement graphic, or symbol transformation graphic, as reset, and otherwise control display of the trigger symbol graphic, symbol collection graphic, bag graphic, symbol movement graphic, or symbol transformation graphic with a current state advanced to a next state value. In some cases, the game controller 202 may selectively trigger the supplemental feature and adjust a trigger symbol graphic, symbol collection graphic, bag graphic, symbol movement graphic, or symbol transformation graphic. In particular, the game controller 202 can, if the supplemental feature is triggered, reset the trigger symbol graphic, symbol collection graphic, bag graphic, symbol movement graphic, or symbol transformation graphic, and otherwise advance the current state of the trigger symbol graphic, symbol collection graphic, bag graphic, symbol movement graphic, or symbol transformation graphic to a next state value.

A typical electronic gaming device is a specially-configured computer system, and not merely a general-purpose computer. For example, one difference between a typical electronic gaming device and common processor-based computer system is that the electronic gaming device is designed to be a state-based system. In a state-based system, the system stores and maintains its current state in non-volatile memory, which can be implemented using battery-backed RAM, flash memory, a solid-state drive, or other persistent memory. Different functions of a game (e.g., bet, play, result, points in the graphical presentation, etc.) may be defined as a state. When a game moves from one state to another, data regarding the game state is stored in a custom non-volatile memory subsystem. In some cases, the gaming device does not advance from a current state to a subsequent state until information that allows the current state to be reconstructed is stored. In the event of a power failure or other malfunction, the gaming device will return to its current state when the power is restored by recovering state information from non-volatile memory. The restored state may include metering information and graphical information that was displayed on the gaming device in the state prior to the malfunction. For instance, if a player was shown an award for a game of chance and, before the award could be provided to the player, the power failed, the gaming device, upon the restoration of power, would return to the state where the award is indicated.

More generally, the gaming device records, in non-volatile memory, the values of game parameters assigned during play, such as variables determined by an RNG or internal counters. (A game parameter, in general, can be one or more variables whose values govern play at the gaming device and depend on a random selection process.) The value of a game parameter can be recorded periodically, in response to some event such as user input, or whenever the value of the game parameter changes. This way, the gaming device can recover its state in case of a power failure or "tilt" event, allowing the gaming device to reconstruct events that have taken place before the power failure or "tilt" event. This requirement affects the software and hardware design on a gaming device. Game history information regarding previous games played, such as an amount wagered, the outcome of the game and so forth, may also be stored in a non-volatile memory device.

In the context of the innovations described herein, for example, a game controller 202 can save information about the current state of a trigger symbol graphic, symbol collection graphic, bag graphic, symbol movement graphic, or symbol transformation graphic in non-volatile memory at various stages. After the trigger symbol graphic is reset to an initial state value, or after the state of the trigger symbol graphic advances to a higher state value, the game controller 202 can save information in non-volatile memory that indicates the state value. The non-volatile memory can also store other state information, such as a current bet amount, bet level, an amount of credits remaining, and/or a win amount for a base reel game, bonus reel game, and/or other supplemental feature. More generally, non-volatile memory can store state information such as positions of the respective reels, in addition to storing information that indicates the configuration of reel strips of the reels. After finishing a base reel game or supplemental feature, the game controller 202 can store information in non-volatile memory that indicates an outcome (e.g., award amount) or status.

Approaches described herein address the technical problem of how to manage interaction between a trigger symbol graphic, symbol collection graphic, bag graphic, symbol movement graphic, or symbol transformation graphic, and a triggering event for selectively triggering a feature.

In terms of technical effects, innovative features of a triggering event with a trigger symbol graphic, symbol collection graphic, bag graphic, symbol movement graphic, or symbol transformation graphic, represent improvements in the technical area of electronic gaming software and provide new technology, in that they improve usability of electronic gaming devices by enhancing the user experience for players and rewarding a player for extended play time on the electronic gaming devices. In some example implementations, the progression of a trigger symbol graphic, symbol collection graphic, bag graphic, symbol movement graphic, or symbol transformation graphic for the triggering event is visible to players. In particular, the progression of a trigger symbol graphic, symbol collection graphic, bag graphic, symbol movement graphic, or symbol transformation graphic for the triggering event may provide a build up to triggering of a feature, which may occur as a reward to players for extended play on an electronic gaming device. These embodiments are thus not merely new game rules or new display patterns.

In at least the state-adaptive variations, true-persistence implementations, and skipped-enhancement variations described herein, using a boost stage with a metamorphic graphical element, such as the trigger symbol graphic, symbol collection graphic, bag graphic, symbol movement graphic, or symbol transformation graphic, offers new ways to achieve a desired game volatility (e.g., increase game volatility) while maintaining a designated level of RTP for a game. Furthermore, by managing weighted tables and/or other aspects of random number generation events for a boost stage with a trigger symbol graphic, symbol collection graphic, bag graphic, symbol movement graphic, or symbol transformation graphic, game play can be kept fair and consistent with regulations while also enabling variation of game volatility for a designated level of RTP for a game.

Thus, some aspects of the disclosure provide a method of awarding a feature prize on a gaming device having a display operable to display a first prize and a second prize, the first prize including a plurality of first prize components, and the second prize including a plurality of second prize components, and a game controller having a processor, a random number generator operable to generate one or more random numbers, and a memory storing a plurality of base symbols, a plurality of trigger symbols, and a plurality of prize component symbols, and instructions, which, when executed, cause the game controller to initiate a feature game. The display device displays a plurality of symbols selected based on one or more random numbers in a plurality of symbol positions in a game area on the display. The processor determines if the plurality of symbols selected include one or more of the plurality of trigger symbols, in response to determining that the plurality of symbols selected include one or more of the plurality of trigger symbols, controls the display device to display the plurality of trigger symbols being configured into a corresponding number of prize component symbols, animates a filling of a plurality of respective prize components of the first prize and the second prize with the corresponding number of prize component symbols; and presents one of the first prize and the second prize when the plurality of respective prize components of the first prize and the second prize have been completely collected.

In one embodiment, the instructions, when executed, cause the at least one processor to animate one of the plurality of trigger symbols to move from one of the plurality of symbol positions into a corresponding prize component of one of the first prize and the second prize.

In one embodiment, the instructions, when executed, cause the at least one processor to determine if a trigger condition has been met, and in response to determining that the trigger condition has been met, increase the plurality of symbol positions in the game area.

In one embodiment, the memory further stores a plurality of weighted prize tables. The instructions, when executed, cause the at least one processor to select a first weighted prize table of the plurality of weighted prize tables, and to apply the first weight prize table to configure the plurality of trigger symbols.

In one embodiment, the first weighted prize table corresponds to a lower prize, and a second weighted prize table corresponds a higher prize. The instructions, when executed, cause the at least one processor to select the first weighted prize table more likely than the second weighted prize table.

In one embodiment, the first prize is associated with the first weighted prize table, and the first weighted prize table further stores a plurality of probabilities corresponding to a plurality of first prize component symbols. The instructions, when executed, cause the at least one processor to randomly select one of the plurality of first prize component symbols based on the plurality of probabilities to configure one of the plurality of trigger symbols.

In one embodiment, each of the plurality of first prize components comprises a first letter of a plurality of letters, and each of the prize component symbols comprises a second letter of the plurality of letters.

In one embodiment, the instructions, when executed, cause the at least one processor to determine if the first letter matches the second letter before completing the plurality of respective prize components.

In one embodiment, the instructions, when executed, cause the at least one processor to remove the second letter for selection from the plurality of prize component symbols.

In one embodiment, the instructions, when executed, cause the at least one processor to determine if the plurality of symbols selected include a free game symbol, and in response to determining that the plurality of symbols selected include the free game symbol, initiate a free game.

In one embodiment, the instructions, when executed, cause the at least one processor to reset the one of the first prize and the second prize to be available for award again when the one of the first prize and the second prize has been awarded.

In one embodiment, the instructions, when executed, cause the at least one processor to reset an associated weight table for the one of the first prize and the second prize that has been awarded.

In one embodiment, the instructions, when executed, cause the at least one processor to determine if the plurality of symbols selected include a predetermined symbol, and, in response to determining that the plurality of symbols selected include the predetermined symbol in a column of symbol positions, animate a nudging of each of the column of symbol positions to display the predetermined symbol.

In one embodiment, the instructions, when executed, cause the at least one processor to conduct the nudging when the one of the first prize and the second prize has been awarded.

In one embodiment, the instructions, when executed, cause the at least one processor to animate a stack of predetermined symbols from the predetermined symbol by a predetermined number of display positions.

In one embodiment, the instructions, when executed, cause the at least one processor to associate each of the corresponding number of prize component symbols with a unique position in the plurality of first prize components.

In one embodiment, the instructions, when executed, cause the at least one processor to grey out the plurality of first prize components and the plurality of second prize components when initiating a feature game.

In one embodiment the instructions, when executed, cause the at least one processor to conduct the feature game as a series of free games.

In one embodiment, the feature game comprises a series of free games, the method further comprises conducting the series of free games.

In one embodiment, the first prize is associated with a first color, the second prize is associated with a second color, each of the corresponding number of prize component symbols is associated with one of the first color and the second color.

In one embodiment, the instructions, when executed, cause the at least one processor to collect each of the plurality of respective prize components at a time.

It will be appreciated that the above provides but one example of how a composite feature can be retriggered within a series of free games.

While the disclosure has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a gaming device operable to display one or more symbols at a plurality of display positions; and at least one server coupled to the gaming device, the at least one server comprising at least one processor and a memory storing i) a symbol set including a plurality of configurable symbols, ii) a plurality of prize component weighted tables, each of the plurality of prize component weighted tables comprising a plurality of configuring symbols and corresponding to each of a plurality of prizes, and iii) instructions, which, when executed, cause the at least one processor to at least:

control the gaming device to display a plurality of symbols selected based on at least one random number generated by a random number generator at the plurality of display positions, control the gaming device to display, in response to the plurality of symbols displayed including a first configurable symbol of the configurable symbols, the first configurable symbol being configured into a first prize component with a first configuring symbol selected from a first prize component weighted table selected to control a relative probability of a first prize among the plurality of prizes, control the gaming device to animate a first portion of the first prize being transformed with the first prize component, and control the gaming device to animate a payout in response to a predetermined number of portions of the first prize having been transformed.

2. The electronic gaming system of claim 1, wherein the instructions, when executed, further cause the at least one processor to remove the first configuring symbol from the first prize component weighted table selected after the first configuring symbol has been selected.

3. The electronic gaming system of claim 2, wherein the instructions, when executed, further cause the at least one processor to restore the plurality of configuring symbols in the first prize component weighted table after the payout.

4. The electronic gaming system of claim 1, wherein each of the plurality of prizes has a respective predetermined number of portions to be transformed.

5. The electronic gaming system of claim 1, wherein the instructions, when executed, further cause the at least one processor to animate the first prize component being moved from one of the display positions toward the first portion of the first prize spaced apart from the display positions.

6. The electronic gaming system of claim 1, wherein the plurality of prize component weighted tables comprises a second prize component weighted table associated with a second prize, the second prize being greater than the first prize, and wherein the instructions, when executed, further cause the at least one processor to more likely select the first prize component weighted table than the second prize component weighted table.

7. A method of displaying a plurality of prizes on an electronic gaming system having a gaming device coupled to at least one server that comprises at least one processor and a memory storing a symbol set including a plurality of configurable symbols and a plurality of prize component weighted tables comprising a plurality of prize component symbols and corresponding to each of the plurality of prizes, the method comprising:

animating at the gaming device a plurality of symbols selected randomly based on at least one random number generated by a random number generator;

in response to the plurality of symbols including a first configurable symbol, animating on the gaming device the first configurable symbol being configured into a first prize component with a first prize component symbol selected from a first prize component weighted table selected to control a relative probability of a first prize among the plurality of prizes;

animating at the gaming device a first portion of the first prize being filled with the first prize component; and animating at the gaming device a payout of the first prize in response to a predetermined number of portions of the first prize having been transformed.

8. The method of claim 7, further comprising removing the first prize component symbol from the first prize component weighted table selected after the first configuring symbol has been selected.

9. The method of claim 8, further comprising restoring the plurality of prize component symbols in the first prize component weighted table after the payout.

10. The method of claim 7, wherein each of the plurality of prizes has a respective predetermined number of portions to be transformed.

11. The method of claim 7, further comprising animating the first prize component being moved toward the first portion of the first prize.

12. The method of claim 7, wherein the plurality of prize component weighted tables comprise a second prize component weighted table associated with a second prize, the second prize being greater than the first prize, and the relative probability of selecting the first prize component weighted table is higher than the relative probability of selecting the second prize component weighted table.

13. The electronic gaming system of claim 1, wherein the first prize further comprises at least one of a progressive prize, a bonus prize, and a mixture of the progressive prize and the bonus prize.

14. The method of claim 7, wherein the first prize further comprises at least one of a progressive prize, a bonus prize, and a mixture of the progressive prize and the bonus prize.

15. A non-transitory computer-readable medium comprising a symbol set including a plurality of configurable symbols, ii) a plurality of prize component weighted tables, each of the plurality of prize component weighted tables comprising a plurality of configuring symbols and corresponding to each of a plurality of prizes, and a plurality of instructions for conducting a game on a gaming device coupled to a server, the plurality of instructions, which, when executed, cause a processor to perform the steps of:

controlling the gaming device to display a plurality of symbols selected based on at least one random number generated by a random number generator at the plurality of display positions;

controlling the gaming device to display, in response to the plurality of symbols displayed include including a first configurable symbol of the configurable symbols, the first configurable symbol being configured into a first prize component with a first configuring symbol selected from a first prize component weighted table selected to control a relative probability of a first prize among the plurality of prizes;

controlling the gaming device to animate a first portion of the first prize being transformed with the first prize component, and controlling the gaming device to animate a payout in response to a predetermined number of portions of the first prize having been transformed.

16. The non-transitory computer-readable medium of claim 15, wherein the instructions, when executed, further cause the processor to perform the step of removing the first configuring symbol from the first prize component weighted table selected after the first configuring symbol has been selected.

17. The non-transitory computer-readable medium of claim 15, wherein the instructions, when executed, further cause the processor to perform the step of restoring the plurality of configuring symbols in the first prize component weighted table after the payout.

18. The non-transitory computer-readable medium of claim 15, wherein each of the plurality of prizes has a respective predetermined number of portions to be transformed.

19. The non-transitory computer-readable medium of claim 15, wherein the instructions, when executed, further cause the processor to perform the step of animating the first prize component being moved from one of the display positions toward the first portion of the first prize spaced apart from the display positions.

20. The non-transitory computer-readable medium of claim 15, wherein the plurality of prize component weighted tables comprises a second prize component weighted table associated with a second prize, the second prize being greater than the first prize, and wherein the instructions, when executed, further cause the processor to perform the step of selecting the first prize component weighted table more likely than the second prize component weighted table.

* * * * *